US011410232B2

(12) United States Patent
Whitten

(10) Patent No.: US 11,410,232 B2
(45) Date of Patent: Aug. 9, 2022

(54) ASYNCHRONOUS TENDERING FOR VARIABLE CHARACTERISTIC ASSETS

(71) Applicant: THE NORDAM GROUP, INC., Tulsa, OK (US)

(72) Inventor: William David Whitten, Tulsa, OK (US)

(73) Assignee: THE NORDAM GROUP LLC, Tulsa, OK (US)

( * ) Notice: Subject to any disclaimer, the term of this patent is extended or adjusted under 35 U.S.C. 154(b) by 292 days.

(21) Appl. No.: 14/748,070

(22) Filed: Jun. 23, 2015

(65) Prior Publication Data

US 2016/0232610 A1   Aug. 11, 2016

Related U.S. Application Data

(60) Provisional application No. 62/114,351, filed on Feb. 10, 2015.

(51) Int. Cl.
*G06Q 40/04* (2012.01)
*G06Q 10/04* (2012.01)
*G06Q 30/08* (2012.01)

(52) U.S. Cl.
CPC .......... *G06Q 40/04* (2013.01); *G06Q 10/04* (2013.01); *G06Q 30/08* (2013.01)

(58) Field of Classification Search
CPC ........ G06Q 40/04; G06Q 40/00; G06Q 40/06; G06Q 40/025; G06Q 30/02; G06Q 30/0283; G06Q 30/0601; G06Q 30/0611
USPC .......................................................... 705/37
See application file for complete search history.

(56) References Cited

U.S. PATENT DOCUMENTS

| | | | | |
|---|---|---|---|---|
| 6,505,174 B1 * | 1/2003 | Keiser | .................. | G06Q 10/063 705/36 R |
| 7,693,748 B1 * | 4/2010 | Mesaros | ............ | G06Q 30/0615 705/26.42 |
| 7,720,708 B1 * | 5/2010 | Elkins, II | ........... | G06Q 30/0207 705/14.23 |
| 8,140,402 B1 * | 3/2012 | Mesaros | ............ | G06Q 30/0641 705/26.1 |
| 8,156,027 B1 | 4/2012 | Haddad et al. | | |
| 8,473,347 B1 * | 6/2013 | Koningstein | .......... | G06Q 30/02 705/14.43 |

(Continued)

*Primary Examiner* — Slade E Smith
(74) *Attorney, Agent, or Firm* — Davis Graham & Stubbs LLP

(57) ABSTRACT

Utilities that allow for the asynchronous tendering for variable characteristic assets. In one aspect, a utility for returning a strike price based on the iterative comparison of a received first listing object with a received first offer object, both corresponding to a first variable characteristic asset. At least one of the first listing object and the first offer object may include a time-dependent price such that the iterative comparison may facilitate the determination of a time-dependent price range corresponding to the variable characteristic asset at a given time. In this regard, the strike price may be returned at least partially based on the time-dependent price range. Additionally, the present disclosure includes embodiments related to the verification of a condition-dependent status of the first variable characteristic asset and a generation of comparison metrics associated with the asynchronous tendering.

38 Claims, 9 Drawing Sheets

(56) References Cited

U.S. PATENT DOCUMENTS

| | | | | |
|---|---|---|---|---|
| 8,527,363 B2* | 9/2013 | Heaton | | G06Q 50/16 705/26.3 |
| 8,775,291 B1* | 7/2014 | Mellman | | G06Q 40/00 705/36 R |
| 8,777,754 B1* | 7/2014 | Santini | | G07F 17/3255 463/42 |
| 9,721,278 B2* | 8/2017 | Ekholm | | G06Q 30/0601 |
| 2001/0032163 A1* | 10/2001 | Fertik | | G06Q 30/08 705/37 |
| 2002/0032633 A1* | 3/2002 | Okumura | | G06Q 30/06 705/37 |
| 2002/0065764 A1* | 5/2002 | Brodersen, Jr. | | G06Q 30/08 705/37 |
| 2002/0107786 A1* | 8/2002 | Lehmann-Haupt | | G06Q 40/04 705/37 |
| 2003/0055664 A1* | 3/2003 | Suri | | G06Q 50/06 705/37 |
| 2003/0093291 A1 | 5/2003 | Dojo et al. | | |
| 2003/0200104 A1* | 10/2003 | Heming | | G06Q 10/10 705/80 |
| 2004/0034587 A1* | 2/2004 | Amberson | | G06Q 40/06 705/36 R |
| 2004/0117290 A1* | 6/2004 | Shacham | | G06Q 10/0637 705/37 |
| 2004/0199450 A1* | 10/2004 | Johnston | | G06Q 40/04 705/37 |
| 2005/0038728 A1* | 2/2005 | La Mura | | G06Q 40/04 705/37 |
| 2005/0049956 A1* | 3/2005 | Ballman | | G06Q 40/04 705/37 |
| 2005/0125474 A1* | 6/2005 | Pednault | | G06F 17/18 708/400 |
| 2005/0131799 A1 | 6/2005 | Clay et al. | | |
| 2005/0283417 A1* | 12/2005 | Miles | | G06Q 30/08 705/35 |
| 2005/0289042 A1* | 12/2005 | Friesen | | G06Q 30/08 705/37 |
| 2006/0074792 A1 | 4/2006 | Wagoner et al. | | |
| 2006/0218074 A1* | 9/2006 | Kohn | | G06Q 40/06 705/37 |
| 2006/0277109 A1* | 12/2006 | Kerth | | G06Q 20/201 705/20 |
| 2008/0052217 A1* | 2/2008 | Etkin | | G06Q 40/04 705/37 |
| 2009/0012904 A1* | 1/2009 | McCord | | G06Q 30/08 705/80 |
| 2009/0307145 A1* | 12/2009 | Mesaros | | G06Q 30/0283 705/80 |
| 2010/0042508 A1 | 2/2010 | Bundy et al. | | |
| 2010/0088250 A1* | 4/2010 | Magnolia | | G06Q 40/04 705/36 R |
| 2010/0121728 A1* | 5/2010 | Sun | | G06Q 30/02 705/26.1 |
| 2010/0198720 A1* | 8/2010 | Mendizabal | | G06Q 30/08 705/37 |
| 2010/0318451 A1* | 12/2010 | Niccolini | | G06Q 40/02 705/35 |
| 2011/0320338 A1* | 12/2011 | Farrell | | G06Q 40/04 705/37 |
| 2012/0041862 A1* | 2/2012 | Bul | | G06Q 40/06 705/37 |
| 2012/0265590 A1* | 10/2012 | Mesaros | | G06Q 30/0206 705/14.13 |
| 2013/0159166 A1* | 6/2013 | Irick | | G06Q 50/16 705/38 |
| 2013/0275252 A1* | 10/2013 | Martin | | G06Q 50/12 705/26.3 |
| 2013/0346248 A1* | 12/2013 | Kraus | | G06Q 30/06 705/26.61 |
| 2014/0207705 A1* | 7/2014 | Strauss | | G06Q 40/06 705/36 R |
| 2014/0279400 A1* | 9/2014 | Allnutt | | G06Q 40/025 705/38 |
| 2014/0310067 A1* | 10/2014 | Ekholm | | G06F 16/22 705/7.35 |
| 2015/0381649 A1* | 12/2015 | Schultz | | H04L 63/1433 726/25 |
| 2016/0364799 A1* | 12/2016 | O'Callahan | | G06Q 40/06 |

* cited by examiner

ASYNCHRONOUS TENDERING FOR VARIABLE CHARACTERISTIC ASSETS

FIELD

The present disclosure relates generally to establishing an efficient market for variable characteristic assets such as used aircraft parts and, in particular, to systems and methods for asynchronous, time-dependent tendering (preferring one or more offers to buy or sell) in an electronic market place for variable characteristic assets

BACKGROUND

Certain marketplace environments are subject to externalities or idiosyncratic considerations that may limit the ability to establish a predictable market or otherwise determine an efficient market price for an indicated good or service A marketplace environment may be subject to these considerations, for example, in a market for goods with variable characteristics (e.g., where goods may exhibit substantial non-uniformity), where the goods are limited in quantity or are unique (e.g., where goods may exhibit substantial or unpredictable scarcity characteristics), and/or where the goods associated with substantial variations in time-sensitive supply or demand (e.g., where the goods may exhibit demand non-uniformity, particularly where the non-uniformity is at least partially based on the dynamic, time-sensitive needs of a given buyer or seller).

Moreover, various unpredictable externalities may be included in such markets. For example, the market for a particular good may be at least indirectly linked to the value (or revenue stream) of a substantially more expensive but related good. This, in turn, may create unpredictable, externalities-type variations in value at least in part because the substantially more expensive good may not be subject to exchange or valuation via the instant market. In this regard, the value of the good for the instant market may vary wildly at least partially based on the particular characteristics of the substantially more expensive related good that is not subject to the instant market.

The case of the market for used aircraft components is illustrative. The value of such components is often highly dependent on one or more variable characteristics such as the condition, age, and time in service or time since servicing of the components. It is difficult to establish a market due to questions concerning the reliability of information concerning such characteristics. Moreover, the value of the component often has a high degree of time dependency due to external considerations. For example, for a buyer, the value of a used aircraft component may be at least partially based on the time revenue stream of a substantially more expensive asset, such as a commercial aircraft. A seller may face pressures to make sales due to, for example, the high costs of inventory or variations in market price. Accordingly, this has been a difficult market to address by conventional models.

For example, a traditional auction fails to address the foregoing challenges. A traditional auction attempts to determine the market price for an item in the context of one to many (i.e., one seller to many potential buyers). In this regard, the traditional auction may be a closed universe that does not allow for consideration of multiple, competing sellers. As such, the traditional auction limits the ability to competitively arrive at an efficient market price. Similarly, a stock market based pricing model also fails to address the foregoing challenges. While a stock market based pricing model attempts to determine the market price in the context of many to many (i.e., many potential sellers to many potential buyers), it does so based generally on the assumption that the underlying asset is a commodity or at least substantially similar (i.e., each unit of traded stock is functionally equivalent or interchangeable). Accordingly, a stock market based pricing model may not be equipped to facilitate price determination for an asset with variable or unique attributes across a given asset class (e.g., the pricing of an asset may be based on the particular condition of the given asset).

In this regard, the foregoing described externalities or idiosyncratic conditions may interfere with the establishment of a predictable market such that buyers and sellers may be limited to transacting at a suboptimal price (e.g., by transacting at a time that does not recognize a coincident interval at which the buyer's willingness to pay most closely aligns with a seller's valuation of a particular good, etc.).

SUMMARY

In view of the foregoing, the present disclosure describes techniques for the asynchronous tendering for variable characteristic assets, thereby facilitating the establishment of an efficient and rational market in a manner that eludes the traditional paradigms of synchronous bartering or auctioning, and of static fixed price marketing. The invention enables buyers and sellers to efficiently manage tenders in relation to time-dependent factors so as to optimize price while accounting for external considerations. In addition, the invention allows for verification of characteristics of assets under consideration by a trusted intermediary such that greater certainty is achieved in the marketplace In one aspect, the present disclosure includes a method for use in asynchronous tendering for variable characteristic assets within a distributed network. The method includes receiving, at a processor of a network server, a first listing object that includes a first listing profile. The first listing profile may be indicative of a listing price corresponding to a first variable characteristic asset. The method further includes receiving, at the processor of the network server, a first offer object that includes a first offer profile. The first offer profile may be indicative of an offer price corresponding to the first variable characteristic asset. In this regard, at least one of the listing price and the offer price may include a time-dependent price. The method further includes iteratively comparing, by the processor of the network server, the received first listing object with the received first offer object to determine a time-dependent price range corresponding to the first variable characteristic asset at a given time. The time-dependent price range may be bounded by the listing price at a minimum value at the given time and by the offer price at a maximum value at the given time. The method further includes returning a strike price at least partially based on the time-dependent price range.

A number of feature refinements and additional features are applicable in the first aspect and contemplated in light of the present disclosure. These feature refinements and additional features may be used individually or in any combination. As such, each of the following features that will be discussed may be, but are not required to be, used with any other feature combinations of the first aspect.

For example, in an embodiment, the first listing profile may be indicative of a condition-dependent status corresponding to the first variable characteristic asset. The indication of condition may be verified by a trusted source such as an appraisal by an independent or objective appraiser.

Notably, the condition-dependent status may be indicative of a physical condition of the first variable characteristic asset. In this regard, the method may further include verifying, by the processor of the network server, the condition-dependent status of the first variable characteristic asset by identifying associations between the first listing object and at least one of a plurality of variable characteristic asset records. Each of the at least one of the plurality of variable characteristic asset records may correspond to a variable characteristic asset and include certification data for the variable characteristic asset. Accordingly, the method may further include determining a condition-dependent verification score at least partially based on said associations.

In another embodiment, the certification data may be indicative of a physical condition of the variable characteristic asset of the variable characteristic asset record. Notably, the physical condition of the variable characteristic asset of the variable characteristic asset record may be at least partially based on an inspection. In this regard, the condition-dependent verification score may be at least partially based on a comparison of the physical condition of the first variable characteristic asset with the physical condition of the variable characteristic asset of the variable characteristic asset record. Additionally, the inspection may include independently audited data indicative of the physical condition of the variable characteristic asset of the variable characteristic asset record.

According to another embodiment, the first listing object may be associated with a seller profile. Notably, the seller profile may include historical transactional data corresponding to at least one completed transaction such that the condition-dependent verification score may be at least partially based on the historical transactional data. Accordingly, the strike price may be at least partially based on the condition-dependent verification score.

In this regard, in an embodiment, the first listing object may be associated with a seller profile. Notably, the seller profile may include historical transactional data corresponding to at least one completed transaction. Accordingly, the returning step may further include returning a generated comparison metric at least partially based on the at least one completed transaction. In this regard, the at least one completed transaction may include a completed strike price, and the comparison metric may include an average strike price corresponding to the completed strike price for the at least one completed transaction. Additionally, the at least one completed transaction may include at least one historical listing price and at least one historical offer price, and the comparison metric may include a transaction completion metric. In this regard, the transaction completion metric may be indicative of at least one of: (1) a completed transaction rate for each of the historical listing price and the historical offer price, and (2) a completed transaction time for each of the historical listing price and the historical offer price. In some instances, the comparison metric may be substantially free from personal identification information associated with the seller profile.

In another embodiment, the iteratively comparing may be modulated by an iteration frequency. Accordingly, the iteration frequency may be at least partially based on at least one of a regular periodic interval, a variable characteristic asset-specific interval, a decreasing interval, an increasing interval, and a variable interval. Additionally, at least one of the listing price and the offer price may change from a first value to a second value in corresponding relation to the iteration frequency. In some instances, the strike price may be substantially free from information associated with the change from the first value to the second value. Of note, the strike price may correspond to a median value of the time-dependent price range.

According to another embodiment, the method may further include opening, at a database of the network server, an escrow account at least partially based on a received indication of an acceptance of the strike price by a buyer and a seller. In this regard, the buyer may be associated with the first offer object and the seller may be associated with the first listing object. The opening step may further include accepting good funds at the escrow account from the buyer and accepting a token indicative of custody of the first variable characteristic asset at the escrow account. The method may further include clearing the escrow account by transmitting the good funds from the escrow account to the seller and transmitting the token from the escrow account to the buyer.

In some instances, the first variable characteristic asset may include a used component for use in an aircraft. Furthermore, the listing price may include a time-dependent listing price, and the offer price may include a time-dependent offer price.

In yet another embodiment, the method may further include receiving, at the processor of the network server, a second listing object that includes a second listing profile indicative of a listing price corresponding to the first variable characteristic asset. Notably, the listing price of the second listing profile may be at least one of: (1) greater than the listing price of the first listing profile, and (2) received after the listing price of the first listing profile. Correspondingly, the method may further include receiving, at the processor of the network server, a second offer object that includes a second offer profile indicative of an offer price corresponding to the first variable characteristic asset. Notably, the offer price of the second offer profile may be at least one of: (1) less than the offer price of the first offer profile, and (2) received after the offer price of the first offer profile.

In this regard, a second aspect of the present disclosure includes a method for use in asynchronous tendering for variable characteristic assets within a distributed network. The method includes establishing a first offer object that includes a first offer profile. The first offer profile may be indicative of an offer price corresponding to a first variable characteristic asset. The method further includes transmitting, over one or more networks of the distributed network, the first offer object to a processor of a network server via a network server portal for iterative comparison by the processor with a first listing object. The first listing object may include a first listing profile indicative of a listing price corresponding to the first variable characteristic asset. In this regard, at least one of the listing price and the offer price may include a time-dependent price. The method further includes receiving a strike price. In this regard, the iterative comparison may include iteratively comparing the established first offer object with the first listing object to determine a time-dependent price range corresponding to the first variable characteristic asset at a given time. Notably, the time-dependent price range may be bounded by the listing price at a minimum value at the given time and by the offer price at a maximum value at the given time such that the received strike price may be at least partially based on the time-dependent price range of the iterative comparison.

A number of feature refinements and additional features are applicable in the second aspect and contemplated in light of the present disclosure. These feature refinements and additional features may be used individually or in any combination. As such, each of the following feature combinations that will be discussed may be, but are not required to be, used with any other feature combinations of the second aspect.

For example, in an embodiment, the first listing profile may be indicative of a condition-dependent status corresponding to the first variable characteristic asset. Notably, the condition-dependent status may be indicative of a physical condition of the first variable characteristic asset. In this regard, the transmitting step may further include transmitting, over the one or more networks of the distributed network, the first offer object to the processor of the network server via the network server portal for verifying the condition-dependent status of the first variable characteristic asset. The verifying may include identifying associations between the first listing object and at least one of a plurality of variable characteristic asset records. Notably, each of the at least one of the plurality of variable characteristic asset records may correspond to a variable characteristic asset and include certification data for the variable characteristic asset. In this regard, the transmitting step may further include transmitting, over the one or more networks of the distributed network, the first offer object to the processor of the network server via the network server portal for determining a condition-dependent verification score at least partially based on said associations.

In another embodiment, the certification data may be indicative of a physical condition of the variable characteristic asset of the variable characteristic asset record. Notably, the physical condition of the variable characteristic asset of the variable characteristic asset record may be at least partially based on an inspection. In this regard, the condition-dependent verification score may be at least partially based on a comparison of the physical condition of the first variable characteristic asset with the physical condition of the variable characteristic asset of the variable characteristic asset record. Additionally, the inspection may include independently audited data indicative of the physical condition of the variable characteristic asset of the variable characteristic asset record.

According to another embodiment, the first listing object may be associated with a seller profile. Notably, the seller profile may include historical transactional data corresponding to at least one completed transaction such that the condition-dependent verification score may be at least partially based on the historical transactional data. Accordingly, the strike price may be at least partially based on the condition-dependent verification score.

In this regard, in an embodiment, the first listing object may be associated with a seller profile. Notably, the seller profile may include historical transactional data corresponding to at least one completed transaction. Accordingly, the receiving step may further include receiving a generated comparison metric at least partially based on the at least one completed transaction. In this regard, the at least one completed transaction may include a completed strike price, and the comparison metric may include an average strike price corresponding to the completed strike price for the at least one completed transaction. Additionally, the at least one completed transaction may include at least one historical listing price and at least one historical offer price, and the comparison metric may include a transaction completion metric. In this regard, the transaction completion metric may be indicative of at least one of: (1) a completed transaction rate for each of the historical listing price and the historical offer price, and (2) a completed transaction time for each of the historical listing price and the historical offer price. In some instances, the comparison metric may be substantially free from personal identification information associated with the seller profile.

In another embodiment, the iterative comparison may be modulated by an iteration frequency. Accordingly, the iteration frequency may be at least partially based on at least one of a regular periodic interval, a variable characteristic asset-specific interval, a decreasing interval, an increasing interval, and a variable interval. Additionally, at least one of the listing price and the offer price may change from a first value to a second value in corresponding relation to the iteration frequency. In some instances, the strike price may be substantially free from information associated with the change from the first value to the second value. Of note, the strike price may correspond to a median value of the time-dependent price range.

According to another embodiment, the transmitting step may further include transmitting, over the one or more networks of the distributed network, the first offer object to the processor of the network server via the network server portal for opening, at a database of the network server, an escrow account at least partially based on a received indication of an acceptance of the strike price by a buyer and a seller. In this regard, the buyer may be associated with the first offer object and the seller may be associated with the first listing object. In this regard, the opening step may further include accepting good funds at the escrow account from the buyer, and accepting a token indicative of custody of the first variable characteristic asset at the escrow account. The transmitting step may further include transmitting, over the one or more networks of the distributed network, the first offer object to the processor of the network server via the network server portal for clearing the escrow account by transmitting the good funds from the escrow account to the seller and transmitting the token from the escrow account to the buyer.

In some instances, the first variable characteristic asset may include a used component for use in an aircraft. Furthermore, the listing price may include a time-dependent listing price, and the offer price may include a time-dependent offer price.

In yet another embodiment, the processor of the network server may include a second listing object that includes a second listing profile indicative of a listing price corresponding to the first variable characteristic asset. Notably, the listing price of the second listing profile may be at least one of: (1) greater than the listing price of the first listing profile, and (2) later in time than the listing price of the first listing profile. Correspondingly, the processor of the network server may include a second offer object that includes a second offer profile indicative of an offer price corresponding to the first variable characteristic asset. Notably, the offer price of the second offer profile may be at least one of: (1) less than the offer price of the first offer profile, and (2) later in time than the offer price of the first offer profile.

In this regard, a third aspect of the present disclosure includes a method for use in asynchronous tendering for variable characteristic assets within a distributed network. The method includes establishing a first listing object that includes a first listing profile. The first listing profile may be indicative of a listing price corresponding to a first variable characteristic asset. The method further includes transmitting, over one or more networks of the distributed network, the first listing object to a processor of a network server via a network server portal for iterative comparison by the processor with a first offer object. The first offer object may include a first offer profile indicative of an offer price corresponding to the first variable characteristic asset. Notably, at least one of the listing price and the offer price may include a time-dependent price. The method further includes receiving a strike price. In this regard, the iterative comparison may include iteratively comparing the established first listing object with the first offer object to determine a time-dependent price range corresponding to the first variable characteristic asset at a given time. Notably, the time-dependent price range may be bounded by the listing price at a minimum value at the given time and by the offer price at a maximum value at the given time such that the received strike price may be at least partially based on the time-dependent price range of the iterative comparison.

A number of feature refinements and additional features are applicable in the third aspect and contemplated in light of the present disclosure. These feature refinements and additional features may be used individually or in any combination. As such, each of the following features that will be discussed may be, but are not required to be, used with any other feature combinations of the third aspect.

For example, in an embodiment, the first listing profile may be indicative of a condition-dependent status corresponding to the first variable characteristic asset. Notably, the condition-dependent status may be indicative of a physical condition of the first variable characteristic asset. In this regard, the transmitting step may further include transmitting, over the one or more networks of the distributed network, the first listing object to the processor of the network server via the network server portal for verifying the condition-dependent status of the first variable characteristic asset. In this regard, the verifying may include identifying associations between the first listing object and at least one of a plurality of variable characteristic asset records. Of note, each of the at least one of the plurality of variable characteristic asset records may correspond to a variable characteristic asset and include certification data for the variable characteristic asset. In this regard, the transmitting step may further include transmitting, over the one or more networks of the distributed network, the first listing object to the processor of the network server via the network server portal for determining a condition-dependent verification score at a least partially based on the associations.

In another embodiment, the certification data may be indicative of a physical condition of the variable characteristic asset of the variable characteristic asset record. Notably, the physical condition of the variable characteristic asset of the variable characteristic assert record may be at least partially based on an inspection. In this regard, the condition-dependent verification score may be at least partially based on a comparison of the physical condition of the first variable characteristic asset with the physical condition of the variable characteristic asset of the variable characteristic asset record. Additionally, the inspection may include independently audited data indicative of the physical condition of the variable characteristic asset of the variable characteristic asset record.

According to another embodiment, the first listing object may be associated with a seller profile. Notably, the seller profile may include historical transactional data corresponding to at least one completed transaction such that the condition-dependent verification score may be at least partially based on historical transactional data. Accordingly, the strike price is at least partially based on the condition-dependent verification score.

In this regard, in an embodiment, the first listing object may be associated with a seller profile. Notably, the seller profile may include historical transactional data corresponding to at least one completed transaction. In this regard, the receiving step may further include receiving a generated comparison metric at least partially based on the at least one completed transaction. In this regard, the at least one completed transaction may include a completed strike price, and the comparison metric may include an average strike price corresponding to the completed strike price for the at least one completed transaction. Additionally, the at least one completed transaction may include at least one historical listing price and at least one historical offer price, and the comparison metric may include a transaction completion metric. In this regard, the transaction metric may be indicative of at least one of: (1) a completed transaction rate for each of the historical listing price and the historical offer price, and (2) a completed transaction time for each of the historical listing price and the historical offer price. In some instances, the comparison metric may be free from personal identification information associated with the seller profile.

In another embodiment, the iterative comparison may be modulated by an iteration frequency. Accordingly, the iteration frequency may be at least partially based on at least one of a regular periodic interval, a variable characteristic asset-specific interval, a decreasing interval, an increasing interval, and a variable interval. Additionally, at least one of the listing price and the offer price may change from a first value to a second value in corresponding relation to the iteration frequency. In some instances, the strike price may be substantially free from information associated with the change from the first value to the second value. Of note, the strike price may correspond to a median value of the time-dependent price range.

According to another embodiment, the transmitting step may further include transmitting, over the one or more networks of the distributed network, the first listing object to the processor of the network server via the network server portal for opening, at a database of the network server, an escrow account at least partially based on a received indication of an acceptance of the strike price by a buyer and a seller. In this regard, the buyer may be associated with the first offer object and the seller may be associated with the first listing object. The opening step may further include accepting good funds at the escrow account from the buyer, and accepting a token indicative of custody of the first variable characteristic asset at the escrow account. In this regard, the transmitting step may further include transmitting, over the one or more networks of the distributed network, the first listing object to the processor of the network server via the network server portal for clearing the escrow account by transmitting the good funds from the escrow account to the seller and transmitting the token from the escrow account to the buyer.

In some instances, the first variable characteristic asset may include a used component for use in an aircraft. Furthermore, the listing price may include a time-dependent listing price, and the offer price may include a time-dependent offer price.

In yet another embodiment, the processor of the network server may include a second listing object that includes a second listing profile indicative of a listing price corresponding to the first variable characteristic asset. Notably, the listing price of the second listing profile may be at least one of: (1) greater than the listing price of the first listing profile, and (2) later in time than listing price of the first listing profile. Correspondingly, the processor of the network server may include a second offer object that includes a second offer profile indicative of an offer price corresponding to the first variable characteristic asset. Notably, the offer price of the second offer profile may be at least one of: (1) less than the offer price of the first offer profile, and (2) later in time than the offer price of the first offer profile.

In this regard, a fourth aspect of the present disclosure includes a computer executed system on a computing device for asynchronous tendering for variable characteristic assets within a distributed network. The computer executed system includes a client, executable by a processor of the computer executed system, operative to receive a first listing object that includes a first listing profile and a first offer object that includes a first offer profile. The first listing profile may be indicative of a listing price corresponding to a first variable characteristic asset, and the first offer profile may be indicative of an offer price corresponding to the first variable characteristic asset. Notably, the at least one of the listing price and the offer price may include a time-dependent price. The computer executed system further includes an iterative comparator engine, executable by the processor of the computer executed system, configured to iteratively compare the received first listing object with the received first offer object to determine a time-dependent price range for the first variable characteristic asset at a given time. In this regard, the time-dependent price range may be bounded by the listing price at a minimum value at the given time and by the offer price at a maximum value at the given time. The computer executed system further includes a portal, executable by the processor of the computer executed system, operative to transmit a strike price. The strike price may be at least partially based on the time-dependent price range.

A number of feature refinements and additional features are applicable in the fourth aspect and contemplated in light of the present disclosure. These feature refinements and additional features may be used individually or in any combination. As such, each of the following features that will be discussed may be, but are not required to be, used with any other feature combinations of the fourth aspect.

For example, in an embodiment, the first listing profile may be indicative of a condition-dependent status corresponding to the first variable characteristic asset. Notably, the condition-dependent status may be indicative of a physical condition of the first variable characteristic asset. In this regard, the computer executed system may further include a verification engine, executable by the processor of the computer executed system. The verification engine may be configured to verify the condition-dependent status of the first variable characteristic asset by identifying associations between the first listing object and at least one of a plurality of variable characteristic asset records. Notably, each of the at least one of the plurality of variable characteristic asset records may correspond to a variable characteristic asset and include certification data for the variable characteristic asset. The verification engine may also be configured to determine a condition-dependent verification score at least partially based on the associations.

In another embodiment, the certification data may be indicative of a physical condition of the variable characteristic asset of the variable characteristic asset record. The physical condition of the variable characteristic asset record may be at least partially based on an inspection. In this regard, the condition-dependent verification score may be at least partially based on a comparison of the physical condition of the first variable characteristic asset with the physical condition of the variable characteristic asset of the variable characteristic asset record. The inspection may include independently audited data indicative of the physical condition of the variable characteristic asset of the variable characteristic asset record. As such, the first listing object may be associated with a seller profile. The seller profile may include historical transactional data corresponding to at least one completed transaction such that the condition-dependent verification score may be at least partially based on the historical transactional data. In some instances, the strike price may be at least partially based on the condition-dependent verification score.

According to another embodiment, the first listing object may be associated with a seller profile. The seller profile may include transactional data corresponding to at least one completed transaction. In this regard, the portal of the computer executed system may be further operable to transmit a generated comparison metric at least partially based on the at least one completed transaction. In this regard, the at least one completed transaction may include a completed strike price, and the comparison metric may include an average strike price corresponding to the completed strike price for the at least one completed transaction. Furthermore, the at least one completed transaction may include at least one historical listing price and at least one historical offer price, and the comparison metric may include a transaction completion metric. In this regard, the transaction completion metric may be indicative of at least one of: (1) a completed transaction rate for each of the historical listing price and the historical offer price, and (2) a completed transaction time for each of the historical listing price and the historical offer price. In some instances, the comparison metric may be substantially free from personal identification information associated with the seller profile.

In this regard, in an embodiment, the iterative comparison of the iterative comparison engine may be modulated by an iteration frequency. Notably, the iteration frequency may be at least partially based on at least one of a regular periodic interval, a variable interval, a variable characteristic asset-specific interval, a decreasing interval, an increasing interval, and a variable interval. Furthermore, the listing price and the offer price may change from a first value to a second value in corresponding relation to the iteration frequency. In some instances, the strike price may be substantially free from information associated with the change from the first value to the second value. Additionally, the strike price may correspond to a median value of the time-dependent price range.

In another embodiment, the computer executed system further includes an escrow engine, executable by the processor of the computer executed system, configured to open an escrow account at a database of the computer executed system at least partially based on a received indication of an acceptance of the strike price by a buyer and a seller. The buyer may be associated with the first offer object and the seller may be associated with the first listing object. In this regard, the escrow engine may be further operable to accept good funds at the escrow account from the buyer, and accept a token indicative of custody of the first variable asset at the escrow account. Additionally, the escrow engine may be operable to clear the escrow account by transmitting the good funds from the escrow account to the seller and by transmitting the token from the escrow account to the buyer.

In some instances, the first variable characteristic asset may include a used component for use in an aircraft. Furthermore, the listing price may include a time-dependent listing price, and the offer price may include a time-dependent offer price.

In yet another embodiment, the client of the computer executed system may be further operable to receive a second listing object that includes a second listing profile indicative of a listing price corresponding to the first variable characteristic asset. Notably, the listing price of the second listing profile may be at least one of: (1) greater than the listing price of the first listing profile, and (2) received after the listing price of the first listing profile. Correspondingly, the client of the computer executed system may be further operable to receive a second offer object that includes a second offer profile indicative of an offer price corresponding to the first variable characteristic asset. Notably, the offer price of the second offer profile may be at least one of: (1) less than the offer price of the first offer profile, and (2) received after the offer price of the first offer profile.

In this regard, a fifth aspect of the present disclosure includes a system for asynchronous tendering for variable characteristic assets within a distributed network. The system includes an access terminal remote from and in operative communication with a computer-executed system. The computer-executed system may be operable to receive a first offer object established by a given user at the access terminal. Furthermore, the first offer object may include a first offer profile indicative of an offer price corresponding to a first variable characteristic asset, and the computer-executed system may be operable to iteratively compare the first offer object with a first listing object. In this regard, the first listing object may include a first listing profile indicative of a listing price corresponding to the first variable characteristic asset. Notably, at least one of the listing price and the offer price may include a time-dependent price. The system further includes a user interface provided at the access terminal for receiving a strike price generated by the computer-executed system. In this regard, the iterative comparison may include iteratively comparing the first offer object with the first listing object to determine a time-dependent price range corresponding to the first variable characteristic asset at a given time. The time-dependent price range may be bounded by the listing price at a minimum value at the given time and by the offer price at a maximum value at the given time such that the received strike price may be at least partially based on the time-dependent price range of the iterative comparison.

A number of feature refinements and additional features are applicable in the fifth aspect and contemplated in light of the present disclosure. These feature refinements and additional features may be used individually or in any combination. As such, each of the following features that will be discussed may be, but are not required to be, used with any other feature combinations of the fifth aspect.

For example, in an embodiment, the first listing profile may be indicative of a condition-dependent status corresponding to the first variable characteristic asset. Notably, the condition-dependent status may be indicative of a physical condition of the first variable characteristic asset. In this regard, the computer executed system may be operable to verify the condition-dependent status of the first variable characteristic asset by identifying associations between the first listing object and at least one of a plurality of variable characteristic asset records. Notably, each of the at least one of the plurality of variable characteristic asset records may correspond to a variable characteristic asset and include certification data for the variable characteristic asset. Additionally, the computer executed system may be operable to determine a condition-dependent verification score at least partially based on the associations.

In another embodiment, the certification data may be indicative of a physical condition of the variable characteristic asset of the variable characteristic asset record, said physical condition of said variable characteristic asset of said variable characteristic asset record. The physical condition of the variable characteristic asset of said variable characteristic asset record may be at least partially based on an inspection. In this regard, the condition-dependent verification score may be at least partially based on a comparison of the physical condition of the first variable characteristic asset with the physical condition of the variable characteristic asset of the variable characteristic asset record. The inspection may include independently audited data indicative of the physical condition of the variable characteristic asset of the variable characteristic asset record. As such, the first listing object may be associated with a seller profile. The seller profile may include historical transactional data corresponding to at least one completed transaction such that the condition-dependent verification score may be at least partially based on the historical transactional data. In some instances, the strike price may be at least partially based on the condition-dependent verification score.

According to another embodiment, the first listing object may be associated with a seller profile. The seller profile may include historical transactional data corresponding to at least one completed transaction. In this regard, the user interface may be further operable to receive a generated comparison metric at least partially based on the at least one completed transaction. In this regard, the at least one completed transaction may include a completed strike price, and the comparison metric includes an average strike price corresponding to the completed strike price for the at least one completed transaction. Furthermore, the at least one completed transaction may include at least one historical listing price and at least one historical offer price, and the comparison metric may include a transaction completion metric. In this regard, the transaction completion metric may be indicative of at least one of: (1) a completed transaction rate for each of the historical listing price and the historical offer price, and (2) a completed transaction time for each of the historical listing price and the historical offer price. In some instances, the comparison metric may be substantially free from personal identification information associated with the seller profile.

In this regard, in an embodiment, the iterative comparison may be modulated by an iteration frequency. Notably, the iteration frequency may be at least partially based on at least one of a regular periodic interval, a variable characteristic asset-specific interval, a decreasing interval, an increasing interval, and a variable interval. Furthermore, at least one of the listing price and the offer price may change from a first value to a second value in corresponding relation to said iteration frequency. In some instances, the strike price may be substantially free from information associated with the change from the first value to the second value. Additionally, the strike price may correspond to a median value of the time-dependent price range.

In another embodiment, the computer executed system may be operable to open an escrow account at a database of the computer executed system at least partially based on a received indication of an acceptance of the strike price by a buyer and a seller. The buyer may be associated with the first offer object and the seller may be associated with the first listing object. In this regard, computer executed system may be further operable to accept good funds at the escrow account from the buyer, and to accept a token indicative of custody of the first variable characteristic asset at the escrow account. Additionally, the computer executed system may be operable to clear the escrow account by transmitting the good funds from the escrow account to the seller by transmitting the token from the escrow account to the buyer.

In some instances, the first variable characteristic asset may include a used component for use in an aircraft. Furthermore, the listing price may include a time-dependent price, and the offer price may include a time-dependent offer price.

In yet another embodiment, the computer executed system may include, at a database of the computer executed system, a second listing object that includes a second listing profile indicative of a listing price corresponding to the first variable characteristic asset. Notably, the listing price of the second listing profile may be at least one of: (1) greater than said listing price of said first listing profile, and (2) later in time than said listing price of said first listing profile. Correspondingly, the computer executed system may include, at a database of the computer executed system, a second offer object that includes a second offer profile indicative of an offer price corresponding to the first variable characteristic asset. Notably, the offer price of the second offer profile may be at least one of: (1) less than the offer price of the first offer profile, and (2) later in time than the offer price of the first offer profile.

In this regard, a sixth aspect of the present disclosure includes a system for asynchronous tendering for variable characteristic assets within a distributed network. The system includes an access terminal remote from and in operative communication with a computer-executed system. The computer-executed system may be operable to receive a first listing object established by a given user at the access terminal. Furthermore, the first listing object may include a first listing profile indicative of a listing price corresponding to a first variable characteristic asset, and the computer-executed system may be operable to iteratively compare the first listing object with a first offer object. In this regard, the first offer object may include a first offer profile indicative of an offer price corresponding to the first variable characteristic asset. Notably, at least one of the listing price and the offer price may include a time-dependent price. The system further includes a user interface provided at the access terminal for receiving a strike price generated by the computer executed system. In this regard, the iterative comparison may include iteratively comparing the first offer object with the first listing object to determine a time-dependent price range corresponding to the first variable characteristic asset at a given time. The time-dependent price range may be bounded by the listing price at a minimum value at the given time and by the offer price at a maximum value at the given time such that the received strike price may be at least partially based on the time-dependent price range of the iterative comparison.

A number of feature refinements and additional features are applicable in the sixth aspect and contemplated in light of the present disclosure. These feature refinements and additional features may be used individually or in any combination. As such, each of the following features that will be discussed may be, but are not required to be, used with any other feature combinations of the sixth aspect.

For example, in an embodiment, the first listing profile may be indicative of a condition-dependent status corresponding to said first variable characteristic asset. Notably, the condition-dependent status may be indicative of a physical condition of the first variable characteristic asset. In this regard, the computer executed system is operable to verify the condition-dependent status of the first variable characteristic asset by identifying associations between the first listing object and at least one of a plurality of variable characteristic asset records. Notably, each of the at least one of the plurality of variable characteristic asset records may correspond to a variable characteristic asset and include certification data for the variable characteristic asset. The computer executed system may also be operable to determine a condition-dependent verification score at least partially based on the associations.

In another embodiment, the certification data may be indicative of a physical condition of the variable characteristic asset of the variable characteristic asset record. In this regard, the physical condition of the variable characteristic asset of the variable characteristic asset record may be at least partially based on an inspection. In this regard, the condition-dependent verification score may be at least partially based on a comparison of the physical condition of the first variable characteristic asset with the physical condition of the variable characteristic asset of the variable characteristic asset record. The inspection may also include independently audited data indicative of the physical condition of the variable characteristic asset of the variable characteristic asset record. As such, the first listing object may be associated with a seller profile. The seller profile may include historical transactional data corresponding to at least one completed transaction such that the condition-dependent verification score may be at least partially based on historical transactional data. In some instances, the strike price may be at least partially based on the condition-dependent verification score.

According to another embodiment, the first listing object may be associated with a seller profile. The seller profile may include transactional data corresponding to at least one completed transaction. In this regard, the user interface may be further operable to receive a generated comparison metric at least partially based on the at least one completed transaction. In this regard, the at least one completed transaction may include a completed strike price, and the comparison metric may include an average strike price corresponding to the completed strike price for the at least one completed transaction. Furthermore, the at least one completed transaction may include at least one historical listing price and at least one historical offer price, and the comparison metric may include a transaction completion metric. In this regard, the transaction metric may be indicative of at least one of: (1) a completed transaction rate for each of the historical listing price and the historical offer price, and (2) a completed transaction time for each of the historical listing price and the historical offer price. In some instances, the comparison metric may be substantially free from personal identification information associated with the seller profile.

In this regard, in an embodiment, the iterative comparison may be modulated by an iteration frequency. Notably, the iteration frequency may be at least partially based on at least one of a regular periodic interval, a variable characteristic asset-specific interval, a decreasing interval, an increasing interval, and a variable interval. Furthermore, at least one of the listing price and the offer price changes from a first value to a second value in corresponding relation to the iteration frequency. In some instances, the strike price may be free from information associated with the change from the first value to the second value. Additionally, the strike price may correspond to a median value of the time-dependent price range.

In another embodiment, the computer executed system may be operable to open an escrow account at a database of the computer executed system at least partially based on a received indication of an acceptance of the strike price by a buyer and a seller. The buyer may be associated with the first offer object and the seller may be associated with the first listing object. In this regard, the computer executed system may be operable to accept good funds at the escrow account from the buyer, and to accept a token indicative of custody of the first variable characteristic asset at the escrow account. Additionally, the computer executed system may be operable to clear the escrow account by transmitting the good funds from the escrow account to the seller by transmitting the token from the escrow account to the buyer.

In some instances, the first variable characteristic asset may include a used component for use in an aircraft. Furthermore, the listing price may include a time-dependent price, and the offer price may include a time-dependent offer price.

In yet another embodiment, the computer executed system may include, at a database of the computer executed system, a second listing object that includes a second listing profile indicative of a listing price corresponding to the first variable characteristic asset. Notably, the listing price of the second listing profile is at least one of: (1) greater than the listing price of the first listing profile, and (2) later in time than the listing price of the first listing profile. Correspondingly, the computer executed system may include, at a database of the computer executed system, a second offer object that includes a second offer profile indicative of an offer price corresponding to the first variable characteristic asset. Notably, the offer price of the second offer profile is at least one of: (1) less than the offer price of the first offer profile, and (2) later in time than the offer price of the first offer profile.

DETAILED DESCRIPTION

Figure 1:
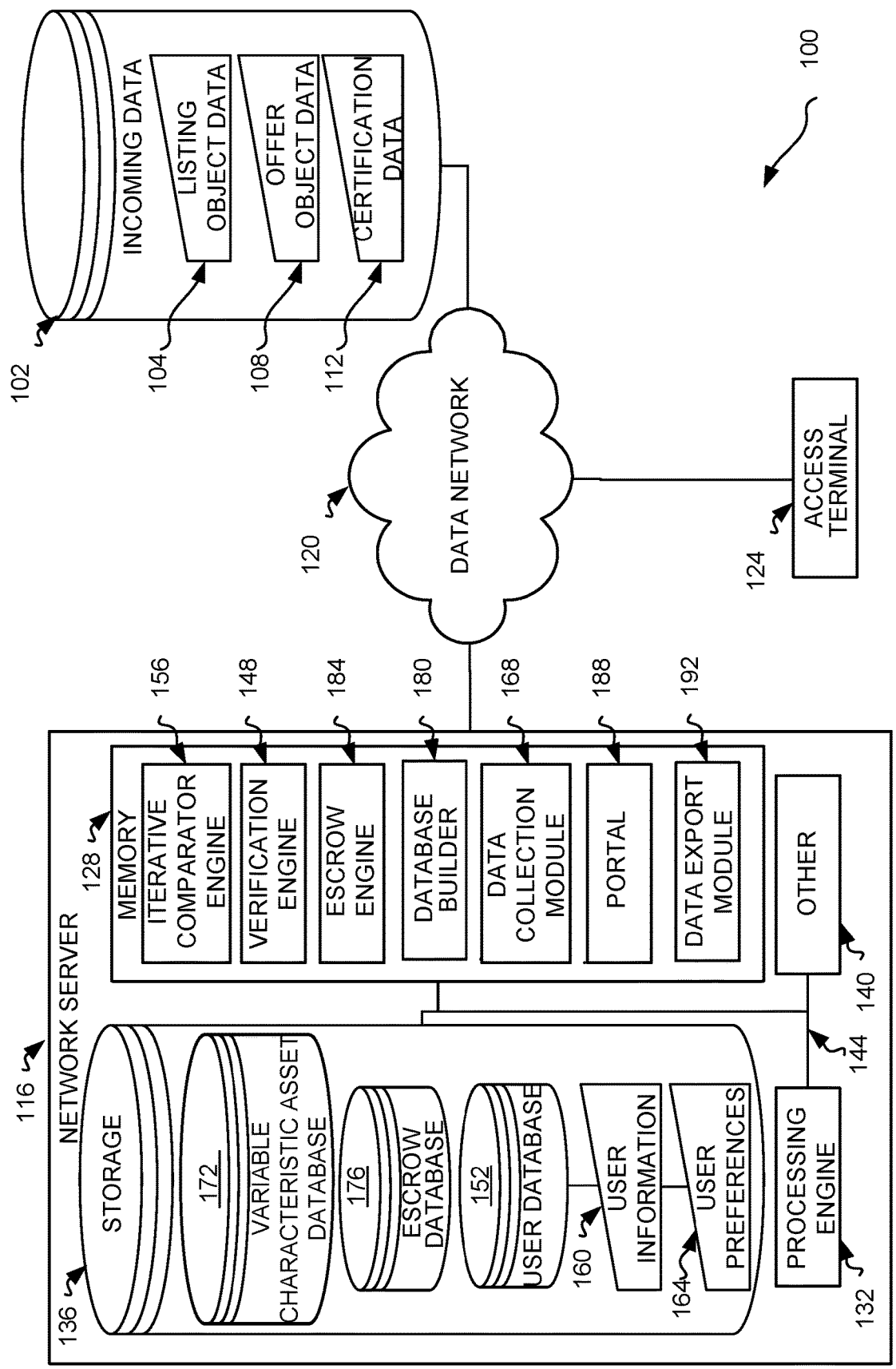
FIG. 1 is an embodiment of a functional block diagram of a system for asynchronous tendering for variable characteristic assets.

The present invention generally relates to the asynchronous tendering of offers for variable characteristic assets (e.g., to establish a market for a used component for use in an aircraft, etc.). For example, the invention may be used to identify a "strike price" for a cooperatively defined time-window (i.e., a transaction price that is amenable to both a buyer and a seller for some overlapping time-window for a given proposed transaction) associated with a market environment that includes asynchronously time-dependent listing prices and offer prices (e.g., the listing and offer prices—"tenders"—may change at non-coincident time intervals). The invention has particular advantages where certain externalities or idiosyncratic considerations (e.g., costs of equipment downtime or end of a sales period) may 22a predominate and interfere with establishment of a predictable market. The invention also has particular advantages where the value of the variable characteristic asset may substantially depend on its condition, and particularly so where the condition is subjective or otherwise difficult to assess in a predictable manner. In such cases, the invention enables establishment of an efficient and rational market in a manner that eludes the traditional paradigms of synchronous bartering or auctioning, and of static fixed price marketing.

The asynchronously time-dependent listing and offer tenders may correspond to an asset (e.g., a used aircraft component) with variable characteristics (e.g., condition-dependent characteristics, such as Time Since New ("TSN"), Time Since Overhaul ("TSO"), and the like). It will be appreciated that such variability further complicates the establishment of a market due to uncertainty of value. In this regard, one or more processing engines may be deployed to iteratively compare a first listing object corresponding to a listing of a seller with a first offer object corresponding to an offer of a buyer, where the offers may specify a conditional attribute (e.g., condition is "good," "fair," or age is "20 years, etc."). Additionally, the invention may facilitate verifying the specified conditional attribute of the variable characteristic asset (e.g., via associating an independent appraisal, audit, or other verification technique with the listing of the seller). In this regard, the iterative comparison may facilitate determination of a time-dependent price range corresponding to the variable characteristic asset at a given time with respect to parameters associated with the condition of the variable characteristic asset. Accordingly, a strike price may be generated based on the time-dependent price range for the variable characteristic asset. The invention may also facilitate other aspects of the asynchronous market, according to other embodiments discussed in greater detail below, such as generating comparison metrics, facilitating escrow management in relation to the asynchronous tendering, and the like.

I. Introduction

A. Asynchronous Tendering

It will be appreciated that, for purposes of the present invention, the asynchronous tendering functionality disclosed herein can be utilized in a variety of ways for a multitude of variable characteristic assets. For purposes of the present discussion, the asynchronous tendering functionality is presented with respect to the asynchronous tendering of used components for use in an aircraft—a variable characteristic asset, as described below. Notwithstanding the present discussion, the various discussed embodiments are not intended to in any way limit the applicability or scope of this invention in any regard.

For the sake of illustration, consider that the market for used aircraft components lacks an efficient mechanism for price discovery, due in part to information asymmetries between sellers of used components and potential buyers (e.g., including information asymmetries associated with value appraisal, supply and demand visibility, and the like). In particular, sellers of used components and potential buyers may have various price and time sensitivities that inhibit price discovery. For example, consider a buyer who needs to purchase a hypothetical "part A" for use in a commercial airliner. The buyer may require the part A within the next 48 hours in order to maintain the normal operations of the commercial airliner. The buyer may also require that part A meet a certain condition threshold in relation to supporting the safe operation of the commercial airliner (e.g., such as requiring a "fair" condition or better). This unpredictable, particularized, and time-sensitive demand of the buyer may create price distortions that influence price discovery (e.g., as may be the case where a commercial airliner valued at tens of millions of dollars is rendered inoperable while waiting for repair via a used part of an approximate $100,000 value). As such, the value of part A to the buyer may dynamically change over time as the 48 hour deadline approaches due in part to the increasing urgency of acquiring the part.

For example, the buyer may value part A at $50,000 at the start of the 48 hour period and $150,000 by the end of the 48 hour period. Notably, the value of part A to the buyer may non-linearly change in step-wise increments over the 48 hours period (e.g., the buyer may value part A at $60,000 at 8 hours into the 48 hour period, $80,000 at 10 hours into the 48 hour period, $140,000 40 hours into the 48 hour period, etc.). The precise, non-linear value change may be adjustable to model the precise demand of the buyer (e.g., one buyer may increase the value initially slowly and followed by a rapid increase, while another buyer may increase the value initially rapidly followed by a gradual increase, or any appropriate combination therein) via a time-dependent offer program indicative of the buyer's projected demand for part A over the cooperatively defined time window. Similarly, the precise step-wise increments and overall time period may be adjustable to model the precise demand of the buyer (e.g., one buyer may elect to assign a value to the needed part every 4 hours of a given time period, while another buyer may elect to assign a value to the needed part at variable increments—2, 3, and 4 hours, etc.—of a given time period, or any appropriate combination therein) via the time-dependent offer program.

Analogous to the buyer, a hypothetical seller may identify a value of a corresponding part A that varies as a function of time (e.g., due to an inventory surplus at the end of a quarter, etc.). At the start of the same 48 hour period (e.g., a cooperatively defined time window, or otherwise at least partially overlapping time-window, etc.), the seller may value that part A at $150,000 (i.e., the seller may be willing to sell part A for $150,000 at an initial time), whereas at the end of the 48 hour period, the seller may value the part A at $90,000 (i.e., the seller may be willing to sell part A for $90,000 at the end of the 48 hour period), just as the value of the part A to the buyer may non-linearly change in step-wise increments over the 48 hour period, so, too, may the value of part A to the seller change according to various non-linear step-wise increments (e.g., via a time-dependent listing program indicative of the value of selling part A over the cooperatively defined time window). Notably, however, the value of part A to the seller may change in non-coincident intervals to that of the buyers (e.g., the buyer may elect to value part A at 4 hour increments, whereas the seller may elect to value part A at variable, increasing increments). Additionally, the buyer may change the value of part A according to a different non-linear function of the seller (e.g., the buyer may change the value of part A at a gradually decreasing slope, whereas the seller may change the value of part A at a gradually increasing slope, etc.).

The dynamic nature of the time-dependent offers of the buyer and the time-dependent listings of the seller may create many challenges to achieving an efficient pricing mechanism. For example, and with continued reference to the foregoing example, absent the disclosed invention, the buyer and seller may not identify the optimal time to execute a transaction for part A—the time-dependent offers and the time-dependent listings alone fail to elucidate a price for part A indicative of the market value of the part at a given time (i.e., an efficient strike price).

To illustrate, consider that at the beginning of the foregoing described 48 hour period, neither the seller nor the buyer would be amenable to a strike price for part A (e.g., at the initial time, the buyer will offer only $50,000 for the part A, and the seller will sell part A for no less than $150,000—no deal will be reached at the initial time). Consider further, however, that despite the existence of a hypothetical strike price at the end of the 48 hour period, the end of the 48 hour period is a suboptimal time to transact, particular so for the buyer (i.e., the buyer may potentially pay $150,000 for part A, which the seller is willing to sell for $90,000). Accordingly, the optimal transaction time may exist at some time "t" within the 48 hour period, at least partially based on the time-dependent offers and time-dependent listings of the buyers and sellers, respectively.

In this regard, the present disclosure involves returning a strike price corresponding to the optimal transaction time by iteratively comparing the seller's time-dependent listings (e.g., as included in a listing object received for the iterative comparison) with buyer's time-dependent offers (e.g., as included in an offer object received for the iterative comparison) to determine a time-dependent price range corresponding to part A at a given time. For example, at 24 hours into the 48 hour period, the buyer may be willing to pay $110,000 for part A, while the seller is willing to sell part A for $108,000. As such, a time-dependent price range may be determined, bounded at a minimum value at $108,000 and a maximum value of $110,000 at the given time of 24 hours into the 48 hour period. Accordingly, a strike price may be returned to the buyer and the seller at least partially based on this time-dependent price range (e.g., inclusive of the time-dependent price range, according to a statistical variation based on variable characteristics, and/or any appropriate determination). In some cases, the strike price may simply "split" the time-dependent price range such that the strike price in the foregoing example may equal $109,000. Other embodiments are envisioned, in which the strike price may be any value in the pre-determined price range (e.g., in some cases, the presence of absence of third party offers, price trends, or other market conditions may be utilized to "weight" the strike price towards one end or the other of the range). And, yet further embodiments are envisioned in which the strike price may be outside of the pre-determined price range. For example, if the buyer bases an offer on a particular characteristic but is flexible (e.g., would offer based on "good" condition but could accept "fair"), price adjustments may be made. This and other variations from the range are described in more detail below.

In another embodiment, the invention may facilitate returning a strike price where the buyer's offer price and the seller's listing price do not create an overlapping price range (e.g., where the buyer's offer price is lower than the seller's listing price). Accordingly, the invention may identify situations in which the buyer and the seller may be amenable to a transaction despite the lack of an overlapping price range. For example, at 20 hours into the 48 hour period the buyer may be willing to pay $108,000 for part A, while the seller is willing to sell part A for $110,000. As such, at 20 hours into the 48 hour period there is no overlapping price range. However, while no overlapping price range exists at 20 hours, the difference between the buyer's offer price and the seller's listing price is relative low in relation to each of the respective prices (i.e., the $2,000 difference between the buyer's offer price and the seller's listing price represents a 1.85% variation above the buyer's offer price and a 1.81% variation below the seller's listing price). As such, a strike price may be returned that represents a variation from either the buyer's offer price (e.g., above the buyer's offer price) or the seller's listing price (e.g., below the seller's listing price) or a variation from both. A buyer and seller may be amenable to the returned strike price, notwithstanding the lack of an overlapping price range, because accepting a slightly higher or lower price may be preferable over the uncertainty associated with waiting for a more favorable price. This is particular so, because neither the buyer nor the seller may know the price or pricing program of the respective counterparty. In one instance, the strike price may be returned according to the difference of the offer price and the listing price in relation to the absolute value of either the offer price and the listing price (e.g., (listing price−offer price)/listing price×100%, etc.). As such, a strike price may be returned where an offer price and/or a listing price is within a certain percentage of the counterparty's price. In some instances, the percentage may be modifiable. According to another embodiment, the invention may return the strike price by iteratively comparing the seller's time-dependent listing with the buyer's time-dependent offers according to various iteration frequencies. That is, the invention may compare the seller's time-dependent listings with the buyer's time-dependent offers at shorter or longer time intervals based on a plurality of user-selected, event driven, and/or preprogrammed iteration frequencies. Accordingly, the user selected, event driven, and/or preprogrammed iteration frequency may be operable to modulate the sequencing (e.g., timing) of the iterative comparison interval of the asynchronous tendering. For example, the iterative comparison may be configured to occur at regular periodic time intervals (e.g., every hour, every two hours, etc.). The regular periodic time intervals will generally be set by the system operator, but may, in some cases, be modifiable by either buyer or seller to increase or decrease the iteration frequency of the iterative comparison. For example, a system operator may establish a regular periodic time interval of every two hours, but may allow a select group of buyer's and seller's the ability to increase the iteration frequency (e.g., a buyer or a seller of "silver status" may iteratively compare at a one hour interval, a buyer or a seller of "gold status" may iteratively compare at a 30 minute interval, and the like). In other instances, the time intervals may be determined by the predicted market conditions corresponding to a particular variable characteristic asset (e.g., asynchronous tendering for a first variable characteristic asset may be identified to optimally function at a first iterative frequency, while asynchronous tendering for a second variable characteristic asset may be identified to optimally function at a second iterative frequency). For example, the system may iterate more quickly for a part that has an active market (many listings and purchase offers) than for a part that has a less active market.

In yet other instances, the iteration may be event-driven rather than periodic. In this regard, the invention may be operative to iteratively compare the seller's time-dependent listing with the buyer's time-dependent offers for each event in which either a time-dependent listing price or time-dependent offer price changes or when a new listing or offer is received. It will be appreciated that the foregoing described iterative comparison may not be limited to regular periodic intervals and event-driven intervals. The iteration frequency may be user-selected and preprogrammed in any appropriate manner to facilitate the return of a strike price for a variable characteristic asset according to the utilities disclosed herein, such as with a regular periodic interval, a variable characteristic asset specific interval, a decreasing interval, an increasing interval, and/or a variable interval.

In another embodiment, at least one of the time-dependent listing and the time-dependent offer may include a time-dependent price (e.g., a time-dependent listing price, a time-dependent offer price, etc.). In this regard, the invention may iteratively compare the seller's time-dependent listing with the buyer's time-dependent offer, where only one of the time-dependent listing and the time-dependent offer includes a time-dependent price. For example, the invention may identify (for the iterative comparison) the time-dependent listing of the seller of part A according to the particular time-dependent listing program (e.g., valuing part A at $150,000 at the initial time period and changing at various non-linear step-wise increments such that seller values part A at $90,000 at the end of the 48 hour period). In this regard, the time-dependent listing may be iteratively compared with the time-dependent offer of the buyer, which in this case may associated with a constant value (e.g., the buyer is willing to pay $100,000 at all times during the 48 hour period). Accordingly, the invention may return a strike price of $100,000 at some time t (e.g., 15 hours) during the 48 hour period (i.e., because the seller may be willing to sell part A for $100,000 at some time t as it decreases its price from $150,000 to $90,000 during the 48 hour cooperatively defined time window).

The invention may additionally present the buyer with a "Buy It Now" price prior to time t. For example, after 10 hours into the 48 hour window, the seller may be willing to sell part A for $110,000. In this regard, the buyer may be presented with a "Buy It Now" price of $110,000. The buyer may be motived to obtain part A at the "Buy It Now" price rather than speculate as to whether the seller will reduce the price further at a future time, or otherwise risk not purchasing the needed part by a known deadline (e.g., despite the value of part A to the buyer of $100,000, the buyer may still be willing to pay an additional $10,000 for the certainty of obtaining the needed part). Determination of the strike price may be further based at least in part on the variable characteristic of the variable characteristic asset. For example, the condition of a used component for use in an aircraft may vary wildly. As the condition varies, so, too, does the value a potential buyer or seller may place on the used component. In this regard, a buyer and a seller of the foregoing described asynchronous tendering exchange may state the value of a variable characteristic asset in terms of an asset condition, which may not necessarily align with the asset condition of the counterparty to the transaction (e.g., the buyer may propose time-dependent offers with respect to part A at a first use condition, whereas the seller may propose time-dependent listings with respect to part A at a second use condition, etc.). In this regard, the invention may be used to return a strike price at least partially based on a variable characteristic (e.g., a use condition) of an asset.

B. Condition-Dependent Variation

By way of illustration, and with returned reference to the foregoing asynchronous tendering, the illustrative buyer may need to purchase the part A in a "fair" condition (or better) in relation to supporting to the safe operation of the commercial airliner. In this regard, the invention may facilitate the asynchronous tendering of a part A that is associated with a condition-dependent status (e.g., TSN, TSO, etc.). Notably, the condition-dependent status may be verified (e.g., via operation of a verification engine, discussed in greater detail below) to support the integrity and reliability of the asynchronous tendering. That is, the system may be operable to independently verify the condition of a variable characteristic asset asserted by a buyer. For example, a buyer may assert (e.g., via creation of a listing object) that a listed part A is of a "fair" condition. In this regard, the assertion of the "fair" condition may be compared and associated with, for example, one or more records corresponding to an independent appraisal of the part A. For example, all users, or users who elect to list a part of "certified" quality, may be required to submit to and pay for an appraisal by an independent subject matter expert. The costs may be paid or apportioned in any appropriate way between the buyer, seller, and system operator. The comparison of the appraisal with the asserted condition of the listing of part A may therefore enhance the integrity of the asynchronous tendering by providing an independent verification mechanism of the condition of part A, thereby facilitating the return of a more accurate strike price corresponding to the actual condition of iteratively compared variable characteristic asset.

To facilitate the foregoing, the condition-dependent status may be normalized for comparison via one or more discrete data attributes defining the condition-dependent status (e.g., poor, fair, average, good, excellent, etc.). That is, for the sake of non-limiting example, an "excellent" part may correspond to a part with a TSN of from 0 to 3 years, a "good" part may correspond to a part with a TSN of from 3 to 6 years, etc. The normalized comparison of condition-dependent status information may be user-selected and/or preprogrammed in any manner appropriate for a given variable characteristic asset. In this regard, the range of numerical values associated with each normalized condition-dependent status may change according to, for example, the type or classification of the variable characteristic asset (e.g., a first variable characteristic asset may be associated with an "excellent" TSN of 0 to 3 years, while a second variable characteristic asset may be associated with an "excellent" TSN of 0 to 5 years, etc.). According to another embodiment, the condition-dependent status may be free from normalization (e.g., it may correspond to a TSN value expressed in terms of years), such that the condition-dependent status independently conveys information pertaining to the variable characteristic asset. In this regard, the condition-dependent status may be objectively compared (i.e., via an objective metric, such as TSN or TSO) across a plurality of similar variable characteristic assets. That is, for example, a listing for a part may simply include its TSN (or some other objective attribute rather than a subjective or grouped characterization.

For example, the time-dependent offers of the buyer for part A may correspond to a hypothetical part A of "good" condition. However, the time-dependent listings of the seller for part A may correspond to an actual part A for sale of a "fair" condition. Accordingly, the condition-dependent status of part A desired by the buyer may not correspond to the condition-dependent status of the part A actually available for sale by the seller. In one embodiment, based on the non-matching condition-dependent status of the time-dependent offer and the time-dependent listing, the invention may not asynchronously tender or otherwise return a strike price in any regard. That is, the buyer may establish pre-determined preferences that indicate a desire to only conduct asynchronous tendering for the precise condition-dependent status specified, in this case a "good" condition part A.

In other embodiments, however, the buyer may establish predetermined preferences that indicate an acceptable condition-dependent variation from that set forth in the time-dependent offer (e.g., the buyer would prefer a "good" condition part A, but would be willing to purchase a part A in the condition range of "fair" to "excellent," depending on the strike price). A buyer may wish to establish variable preferences to expand the number of available purchase options, particularly so when a buyer must replace a part before a rapidly approaching deadline (e.g., a buyer may be more flexible as to the condition-dependent status of the variable characteristic asset as the deadline to replace, for example, the used aircraft component approaches). In this regard, a strike price may be returned for the hypothetical buyer and seller of part A, where the buyer is willing to consider time-dependent listings of a condition-dependent status that vary from that contained within the time-dependent offer. As such, a strike price may be returned based on the time-dependent price range (inclusive or exclusive of the time-dependent price range) with respect to a variety of algorithms that incorporate the extent of variation in the condition-dependent status, as well as market trends, historical data, and the like. For the sake of a non-limiting example, in part because of the variation of the condition-dependent status of the time-dependent offer and the time-dependent listing of previously discussed part A, the strike price for part A may be returned at $108,000 at 24 hours into the 48 hour period (i.e., the strike price may be adjusted to the minimum value of the price dependent range of $108,000 to $110,000 because the time-dependent listing is for a part of inferior quality than contained within the time-dependent offer).

As will be appreciated from the foregoing discussion, the condition-dependent status may impact the strike price value substantially, as well as determine whether a transaction will occur at all. In this regard, the present invention may be used to verify the condition-dependent status of a variable characteristic asset of the time-dependent listing. In one instance, certification data pertaining to the variable characteristic asset may be utilized to verify the condition-dependent status asserted, for example, for the particular variable characteristic asset of the asynchronous tendering (e.g., such as that of a listing object received for the iterative comparison). In this regard, the invention may be operable to identify various associations among a created listing object (e.g., received for the iterative comparison) and at least one of a plurality of variable characteristic asset record and determine a condition-dependent verification score at least partially based on the associations. As such, the invention may facilitate the determination of the accuracy (e.g., via a confidence interval or the like) of the asserted condition-dependent status of the variable characteristic asset of the listing object. In this regard, for a seller that proposed to sell a part of "fair" condition, for example, the system may facilitate the determination of the veracity of the assertion that the variable characteristic asset is actually of a "fair" condition. In this regard, each of the at least one the plurality of variable characteristic asset record may correspond to an analogous or matching variable characteristic asset (e.g., analogous or matching to the variable characteristic asset of the listing object) and include certification data associated with the variable characteristic asset. The certification data may be indicative of a third-party physical inspection of the variable characteristic asset (e.g., such as an independent appraisal of the variable characteristic asset). As such, certification data may provide an objective measure (e.g., via surveys, audits, and/or other quality control systems or processes) by which to evaluate the condition of the variable characteristic asset. In other instances, for example, when the variable characteristic asset record does not contain matching or analogous variable characteristic assets, the verification of the condition-dependent status may include an assessment of the actual condition of variable characteristic assets of previously completed transactions associated with the same seller as the instant proposed transaction (e.g., by reference to reputational metrics of the given seller). Accordingly, the variable characteristic asset of the time-dependent listing may be verified according to one or more of the methods described above. In turn, this verification may provide the system with a heightened level of integrity that may facilitate the efficient price discovery aspects herein disclosed (e.g., by incentivizing accurate time-dependent listings that reflect the true condition-dependent status of variable characteristic assets by reputational, monetary, and/or other enforcement mechanisms).

C. Asynchronous Tendering Implementation

As will be further appreciated from the foregoing, the value associated with a variable characteristic asset may change on a macro scale. For example, even with all other things being equal (e.g., the quality of the asset, demand curve, etc.), the value of the variable characteristic asset may change for different geographies, different times of the year, or with any other appropriate conditions. In this regard, the invention may be used to compare a returned strike price (and/or current buy or sell offer price) with an analogous price corresponding to previous relevant transactions (e.g., an average strike price based on historical data) based on a variety of settings and data filters (e.g., geography, time scale, condition-status variables, etc.). This comparison may facilitate evaluation of the strike price with respect to similar (or dissimilar) transactions, which may in turn inform the decision of the buyer and the seller as to whether to execute a transaction at the returned strike price. For example, upon the return of the strike price $109,000 for the foregoing described part A, the invention may return a comparator price of $100,000 indicative of an average strike price for part A for analogous previously completed transactions.

In this regard, the invention may include various privacy features operable to prevent disclosure of sensitive information in relation to particular buyers and sellers. For example, in the context of returning analogous strike prices of past transactions, the invention may limit the level of information available to either counterparty to the transaction (e.g., the seller may be barred from learning the buyer's recent transaction details, the buyer may be barred from learning the seller's recent transaction details, etc.). Additionally, information may be limited as to either the seller or buyer learning of the counterparty's particular time-dependent program (i.e., neither the seller nor the buyer may learn when the counter-party may change its time-dependent price). This may facilitate discouraging behavior that may distort the value of a returned strike price (i.e., waiting until the end of the cooperatively time period for purposes of obtaining a more advantageous strike price). Upon return of a strike price, as neither buyer nor seller knows if the price will subsequently change (for the better or the worse), both parties are incentivized to seriously and honestly evaluate the instant strike price. Notwithstanding the foregoing privacy features, however, the invention may return analogous strike prices corresponding to past transactions based on anonymized data (e.g., via aggregated data, scrubbed data, and/or the like).

Additional metrics may be provided to the buyer and the seller at this point, such as an indication of a percentage variation between the instant strike price and an approximate market value strike price at least partially based on analogous past transactions. The additional metric may include, for example, a Concluded Deal Report, a Seller Opportunity Report, a Buy Order Report, and a Gap Report, each discussed in greater detail below. In other embodiments, the invention may present additional metrics to facilitate the tendering for variable characteristic assets. According to one embodiment, the invention may provide a "Gap Report" indicative of various aggregated minimum and maximum offers and listings historically received for a given variable characteristic asset. For example, a buyer's Gap Report may present a range of historically received values for a given variable characteristic asset (i.e., spanning a range from the minimum received offer to the maximum received offer). The range of historically received values may be represented along a curve indicative of the probability of returning a strike price at each given value (e.g., a first received offer price may correspond to the return of a strike price at a first completion rate, while the a second received offer price may correspond to the return of a strike price at a second completion rate, etc.). As such, the Gap Report may present an analysis at least partially based on successful and unsuccessful past offer prices.

It will be appreciated that for the sake of illustration, the Gap Report is described with respect to a buyer's Gap Report. Analogous functionality is also contemplated for a seller's Gap Report, as discussed in greater detail below.

In certain other embodiments, the invention may facilitate completion of the transaction executed at the returned strike price by the generation, funding, and clearing of an escrow account. In this regard, the invention may intermediate an agreed transaction by transferring custody of good funds and of the variable characteristic asset (e.g., via a token indicative of custody transfer of the variable characteristic asset) to the respective appropriate parties. For example, the invention may receive an indication of an accepted transaction based at least partially on both the buyer and the seller agreeing to the returned strike price. In turn, an escrow account may be created such that the buyer may deposit good funds and such that the seller may deposit a token indicative of a custody transfer of the variable characteristic asset. Accordingly, the invention may facilitate clearing the escrow account by transferring the deposited goods to the seller and transferring the deposited token indicative of a custody transfer to the buyer. In some instances, the transaction execution via the escrow account may facilitate efficient strike price discovery by lowering transaction costs between the buyer and seller (i.e., by removing costs from the strike price inherently associated with a transaction verification function—the costs associated with the transaction risk are reduce because the transaction is effectuated by a trusted, independent third-party).

According to another embodiment, the invention may be operable to facilitate the iterative comparison for a variable characteristic asset where multiple sellers and multiple buyers compete for the right to buy and/or seller a particular variable characteristic asset. For example, consider a scenario in which multiple sellers wish to sell the same part A to a single buyer. In this regard, the invention may return a strike price to the single buyer based on an iterative comparison of the buyer's offer object with the sellers' listing objects such iterative comparison may be configured to simply take the lowest listing price, to favor older listings (or listings close to expiration), or other factors. As a further example, consider the scenario in which multiple buyers wish to purchase the same part A from a single seller. In this regard, the invention may return a strike price to the single seller based on an iterative comparison of the buyers' offer objects to a seller's listing object. The comparison may be configured to simply take the highest offer or may take into account the age or expiration of the offers or other factors. In this regard, the invention may facilitate good faith use of the asynchronous tendering in part by prioritizing older offers and listings over that of newer offers and listings, and honoring the efficient market price of the particular variable characteristic asset (e.g., by accepting the lowest listing price, as in the case for multiple listing, and accepting the highest offer price, as in the case for multiple offers).

II. System Overview

A. System Architecture

Reference will now be made to the accompanying drawings, which assist in illustrating the various pertinent features of the various novel aspects of the present disclosure. The following description is presented for purposes of illustration and description. Furthermore, the description is not intended to limit the inventive aspects of the forms disclosed herein. Consequently, variations and modifications commensurate with following teachings, and skill and knowledge of the relevant art, are within the scope of the present invention.

In this regard, FIG. 1 presents a functional block diagram of an illustrative distributed network 100 in which various data attributes may be received and/or accessed to facilitate the asynchronous tendering of variable characteristic assets. Broadly, the distributed network 100 may include any appropriate hardware (e.g., computing devices, data centers, switches), software (e.g., logic, computer readable instruction, applications system programs, engines), network components (e.g., communication path interfaces, routers), and the like (not necessarily shown an interest of clarity) for use in facilitating any appropriate operations of the network. The distributed network 100 may include multiple types of sources of incoming data 102; namely, listing object data 104, offer object data 108, certification data 112, and/or the like.

In one embodiment, a network server 116 is configured to receive and process the incoming data 102 transmitted over one or more data networks 120 (e.g., a WAN, a LAN, and/or the Internet) in order to support the asynchronous tendering of variable characteristic assets. For instance, listing object data 104 may include a first listing object that includes a first listing profile indicative of a listing price corresponding to a first variable characteristic asset, offer object data 108 may include a first offer object that includes a first offer profile indicative of an offer price corresponding to the first variable characteristic asset, and certification data 112 may include data to certify a condition-dependent status of the first variable characteristic asset. As used herein, the term "object" signifies any appropriate data structure that may be transmitted over the one or more networks 120 and stored in any appropriate in an appropriate computing storage (e.g., storage 136).

The receipt, processing, and storage of each of the foregoing data types may facilitate the asynchronous tendering of variable characteristic assets. For example, in one embodiment, the network server 116 may determine a time-dependent price range by iteratively comparing a received first listing object with a received first offer object to determine a time-dependent price range corresponding to the first variable characteristic asset at a given time. Notably, the time-dependent price range may be bounded by the listing price at a minimum value at the given time and by the offer price at a maximum value at the given time. In this regard, the network server 116 may be operable to return a strike price (e.g., via portal 188 via the one or more networks 120) at least partially based on the time-dependent price range.

The network server 116 may generally employ various components to receive and process the incoming data 102 to facilitate the asynchronous tendering of variable characteristic assets. As shown, the network server 116 may include a memory 128 (e.g., RAM, other volatile memory modules, etc.) that contains one or more modules or engines that process incoming data 102; a processing engine 132 (e.g., one or more processors, processing engines, CPUs, etc.) that executes the modules or engines from the memory 128 (e.g., iterative comparator engine 156, verification engine 148, escrow engine 184, database builder 180, data collection module 168, portal 188, and data export module 192); storage 136 (e.g., one or more magnetic disks, solid-state drives, or other non-volatile memory modules) for storing incoming data 102 and processed data (e.g., configured order objects, master pull group objects, etc.); and a number of other components 140 (e.g., input devices such as a keyboard and a mouse, other devices such as a display and speakers, and the like), all of which may be appropriately interconnected by one or more system buses 144.

The one or more engines of the network server 116 may generally facilitate the processing of the incoming data 102 by performing a plurality of incoming functions and storing resultant data in one or more databases of storage 136 (e.g., for use in the asynchronous tendering of variable characteristic assets). Each of the engines (and/or other engines, modules, logic, etc. disclosed and/or encompassed herein) may be in the form of one or more sets of computer readable instructions for execution by the processing engine 132, and may be manipulated by users in any appropriate manner to analyze and configure the listing object data 104, offer object data 108, and certification data 112 as disclosed herein. In this regard, the combination of processing engine 132, memory 128, and/or storage 136 (i.e., machine/hardware components), and the various engine/models disclosed herein in one embodiment create a new machine that becomes a special purpose computer once it is programmed to perform particular functions of the utilities disclosed herein (e.g., pursuant to instructions from program software). While various engines have been depicted in FIG. 1 as being separate and distinct engines, it is understood that the functionalities or instructions of two or more the engines may actually be integrated as part of the same computer-readable instructions set, and that the various engines have been depicted in the manner shown in FIG. 1 merely to highlight various functionalities of the system.

In this regard, in one arrangement, the network server 116 may include a data collection module 168 that receives the incoming data 102 over the one or more data networks 120 and facilitates the storage of the incoming data 102 in any appropriate manner (e.g., in one or more databases, such as user database 152). In this regard, the user database 152 may store a plurality of received listing objects (e.g., listing object data 104), a plurality of offer objects (e.g., offer object data 108) and/or other relevant information to facilitate the asynchronous tendering of variable characteristic assets (e.g., user information 160, user preferences 164, etc.). In some instances, the received listing objects and received offer objects may receive in response to the creation of a listing object and/or an offer object (e.g., consider screenshot 300 and 400 of FIGS. 3 & 4, respectively, which illustrates the creation of a listing object and an offer object). Additionally, the data collection module 168 may be operable to collect a plurality of other data types, including certification data 112, for storage in any appropriate manner in storage 136 (e.g., for storage in variable characteristic asset database 172).

The network server 116 may also include database builder 180 that is configured to manipulate the incoming data 102 to facilitate the asynchronous tendering (e.g., to iteratively compare a received listing object with an appropriately corresponding received offer object). In some instances, the database builder 180 may associate certification data 112 with an appropriate variable characteristic asset record of the variable characteristic asset database 172 (e.g., for use by the verification engine 148 to generate a condition-dependent verification score, discussed in greater detail below).

In this regard, the network server 116 may also include an iterative comparator engine 156 to facilitate the iterative comparison of the received listing object with the received offer object. As such, the iterative comparator engine 156 may perform any appropriate functions to determine a time-dependent price range based at least partially on the received listing object and the received offer object (e.g., such that the network server 116 may return a strike price to effectuate a transaction for the asynchronous tendering for the variable characteristic asset). For example, according to one embodiment, the iterative comparator engine 156 may compare the various parameters of the listing object with the various parameters of the offer object according to an iteration frequency (e.g., indicative of the modulation of sequencing of the iterative comparison). Notably, the iterative comparator engine 156 may be operable to facilitate the foregoing iterative comparison based on any number of user-selected or preprogrammed parameters. Accordingly, the iterative comparator engine 156 may access at least one of the received listing objects, received offer objects, and/or other user-specific criteria (e.g., intercepted at incoming data 102 or access via storage 136).

The network server 116 may also include a verification engine 148 operable to identify associations between the received listing object and at least one of a plurality of variable characteristic asset records and determine condition-dependent verification score. In this regard, the verification engine 148 may be operable to access the at least one of the plurality of variable characteristic asset records of storage 136 (e.g., variable characteristic asset database 172, etc.). The accessed variable characteristic asset records may include certification data indicative of a physical condition of a variable characteristic asset (e.g., a physical condition as verified by any appropriate technique, including an independent appraisal of the condition of the variable characteristic asset), which may in turn be compared with an asserted condition-dependent status of a variable characteristic asset of the received listing object. As such, the verification engine 148 may determine a condition-dependent verification score based at least partially on the similarities of foregoing comparison.

The network server 116 may also include an escrow engine 184 operable to facilitate the completion of a transaction of the asynchronous tendering. That is, upon the agreement of both buyer and seller to a particular returned strike price, the escrow engine 184 may facilitate the completion of the accepted transaction by assisting the parties in the transfer of good funds and the variable characteristic asset. Accordingly, the escrow engine 184 may be operable to open an escrow account (e.g., at the network server 116, such as at escrow account database 176, and/or via the distributed network 120) and accept both good funds (i.e., from the buyer) and a token indicative of custody transfer of the variable characteristic asset (i.e., from the seller). The escrow engine 184 may also be operable to clear the created escrow account (e.g., by transmitting the accepted good funds and the accepted token to the appropriate parties).

Figure 2:
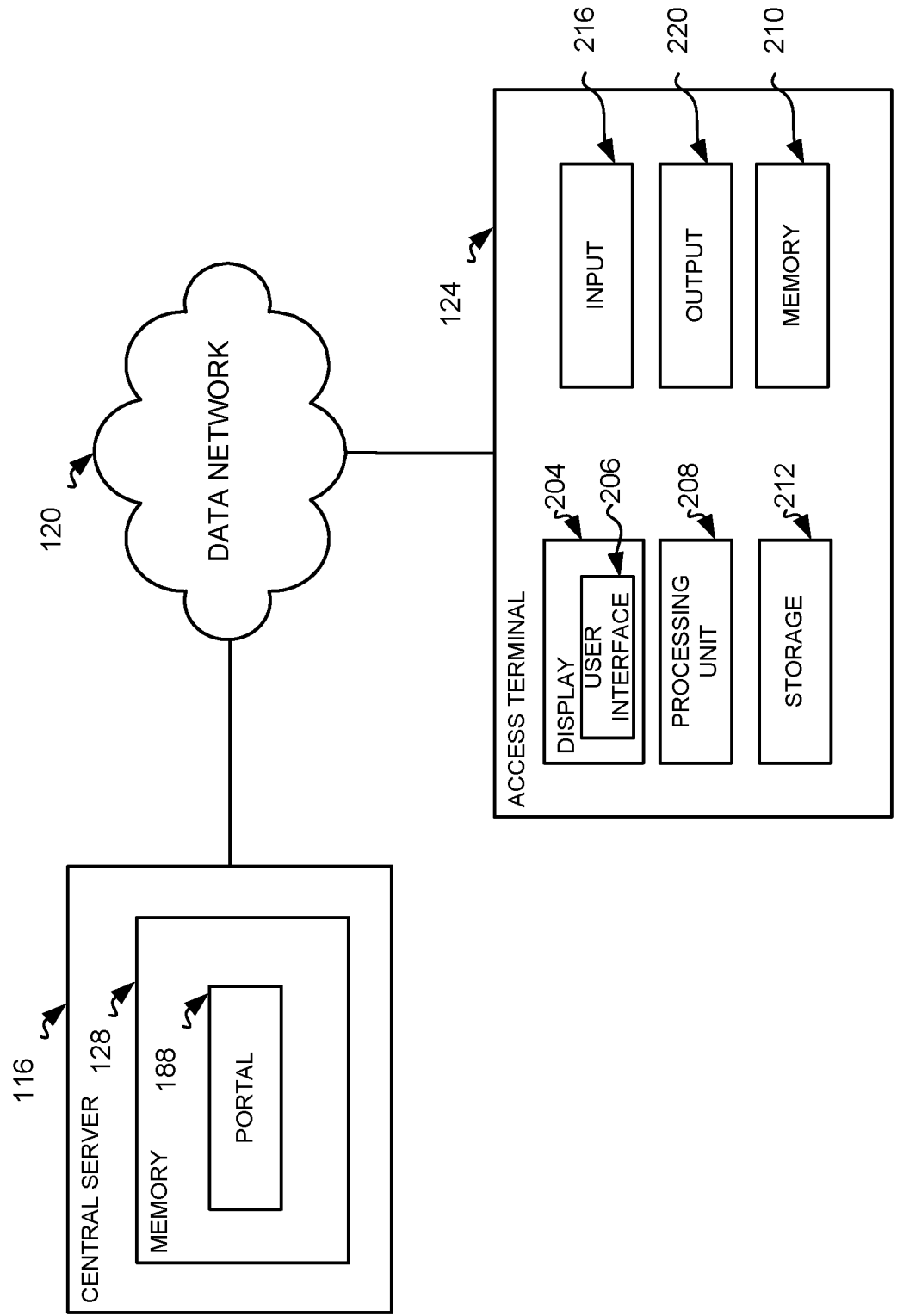
FIG. 2 is an embodiment of a more detailed functional block diagram of the access terminal of FIG. 1.

Turning next to FIG. 2, a more detailed functional block diagram of the access terminal 124 is depicted for use in receiving the transmitted information of the network server 116. The access terminal 124 may generally employ various components to receive the transmitted information. As shown, the access terminal 124 may include a display 204 (e.g., LCD screen, LED screen, or the like) that presents information associated with the network server 116 to the user via a user interface 206; processing unit 208 (e.g., one or more processors, processing engines, CPUs, etc.) operable to receive the transmitted information; memory 210 (e.g., RAM, other volatile memory, etc.); and storage 212 (e.g., one or more magnetic disks, solid-state drives, or other nonvolatile memory modules) for storing the received transmitted information. Moreover, access terminal 124 may be operable to receive input 216 (e.g., in response to information presented on display 204) and transmit output 220 (e.g., indicative of a request for information from central server 116). In this regard, network server 116 may transmit information associated with the iterative comparator engine 156, the verification engine 148, and/or the escrow engine 184. For example, this may occur by any appropriate browser (not shown) running on the memory 210 of the access terminal 124 that may appropriately access the portal 188 via external data network 120 (which may entail entering or providing any appropriate credentials such as username and password).

B. User Interface

Reference will now be made to a number of representative screenshots of the portal 188 that may be presented on, for example, display 204 of the access terminal 124 and that may be manipulated by the user to facilitate in the asynchronous tendering of variable characteristic assets in a distributed network. It should be understood that the various functionalities disclosed herein are not limited to use with such specific screenshots as presented. Rather, the screenshots are merely provided to facilitate the reader's understanding of the various programs, modules, and other functionalities disclosed herein.

Figures 3, 4:
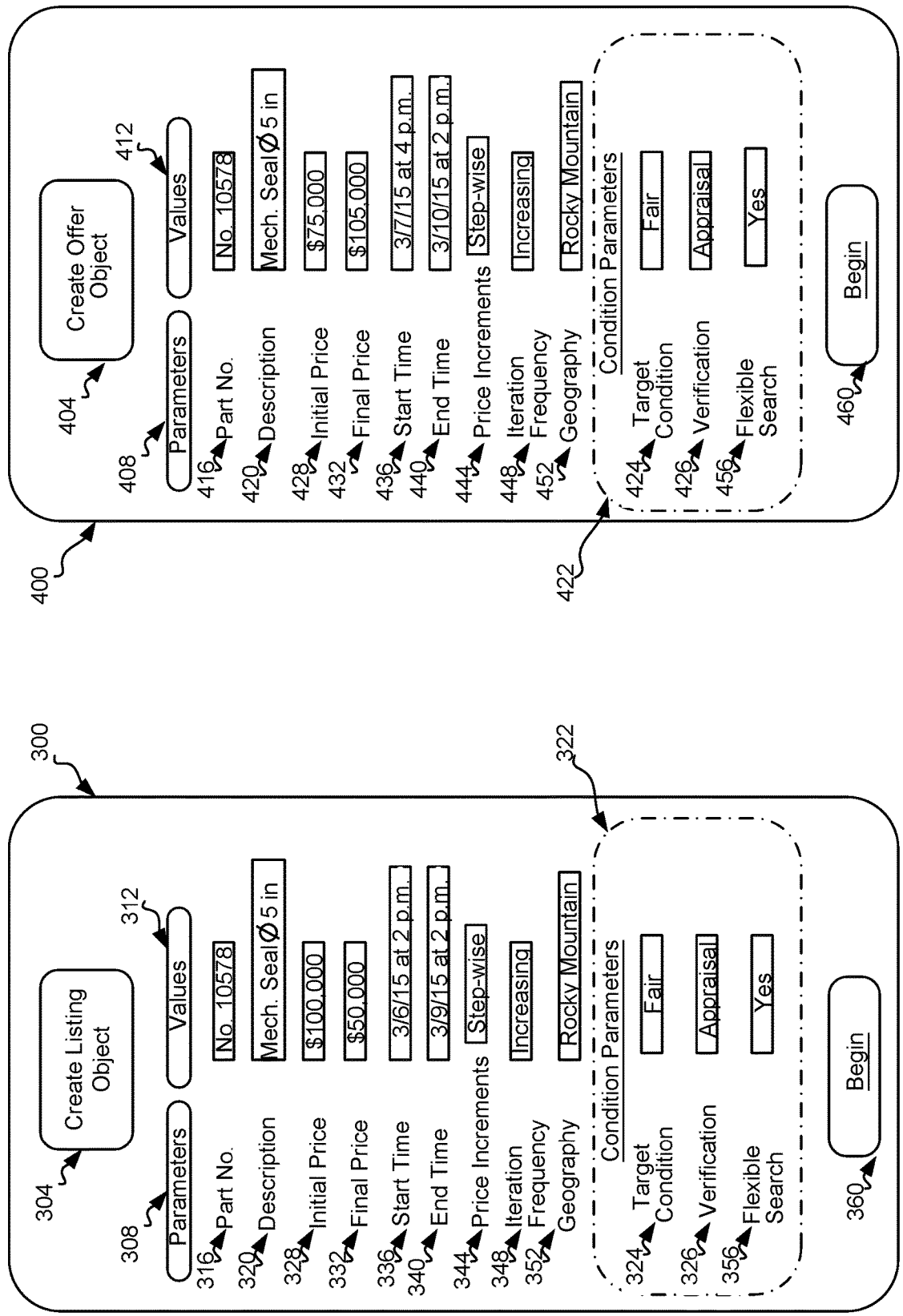
FIGS. 3-7 illustrates various screenshots of a user interface of a portal of the system of FIG. 1.

In this regard, turning next to FIG. 3, a screenshot 300 is depicted in which the create listing object button 304 has been manipulated such that a hypothetical seller may create a listing object for use in the asynchronous tendering of a variable characteristic assets (e.g., by populating one or more data fields with information specific to the creation of a desired listing object). Accordingly, the screenshot 300 may include a plurality of listing parameters 308 associated with the creating of a listing object. Each of the listing parameters 308 may facilitate the asynchronous tendering of variable characteristic assets by, for example, defining various applicable criteria for iterative comparison (e.g., including information associated with the variable characteristic asset, such as the part number and description, and the character of the iterative comparison of the asynchronous tending, such as the price increments and the iteration frequency). In this regard, each of the listing parameters 308 may be associated with a corresponding listing value 312. In this regard, the corresponding listing value 312 may be modifiable by the user according to the particular applicable criteria desired. It will be appreciated, that listing parameters 308 may include any appropriate criteria to create a listing object for the facilitation of the asynchronous tendering of variable characteristic assets, including mandatory criteria, optional criteria, variable criteria, or any other user-modifiable criteria. According to one embodiment, the listing parameters 308 may include a part number field 316, a description field 320, an initial price field 328, a final price field 332, a start time field 336, an end time field 340, a price increments field 344, an iteration frequency field 348, and/or a geography field 352. Additionally, the listing parameters 308 may include listing parameters associated with a conditions parameters button 322, discussed in greater detail below. In this regard, the listing parameters 308 may further include a target condition field 324, a verification field 326, and/or a flexible search field 356.

For the sake of illustration, reference will now be made to the corresponding values 312 of the parameters 308, as depicted in screenshot 300 to demonstrate the creation of a listing object. In this regard, a hypothetical seller of a variable characteristic asset may create a listing object (e.g., for iterative comparison via the asynchronous tendering methodology disclosed herein) for a part number 10578 (e.g., as depicted by the corresponding value of part number field 316). Accordingly, each of the corresponding listing values 312 may be populated according to the desired characteristics of the asynchronous tendering for the part number 10578 (the "indicated part" for purposes of discussion). This may include, for example, a description of the indicated part (e.g., mechanical seal of a 5 inch diameter as depicted by the corresponding value of description field 320). The corresponding listing values 312 may also include a value corresponding to the initial price (i.e., the price at which the hypothetical seller may be willing to sell the indicated part at the start of the asynchronous tendering) of the indicated part (e.g., $100,000 as depicted by the corresponding value of initial price field 328) and a value corresponding to the final price (i.e., the price at which the hypothetical seller may be willing to sell the indicated part at the end of the asynchronous tendering) of the indicated part (e.g., $50,000 as depicted by the corresponding value of final price field 336).

Furthermore, the corresponding listing values 312 may also include a value corresponding to the start time (i.e., the time at which the hypothetical seller wishes to initiate the asynchronous tendering) of the indicated part (e.g., Mar. 6, 2015 at 2 PM as depicted by the corresponding value of the start time field 336) and a value corresponding to the end time (i.e., the time at which the hypothetical seller wishes to terminate the asynchronous tendering) of the indicated part (e.g., Mar. 9, 2015 at 2 PM as depicted in the end time field 344). In this regard, the corresponding listing values 312 may also include values operable to manipulate the iterative comparison of the asynchronous tendering. For example, the corresponding listing values 312 may include a value corresponding to the variation in price increments (i.e., indicative of the magnitude of the change in price for each iteration of the iterative comparison) over the duration of the asynchronous tendering (e.g., stepwise as depicted by the corresponding value of the price increments field 344). Additionally, the corresponding listing values 312 may include a value corresponding to the iteration frequency (i.e., the interval at which price changes) for the course of the asynchronous tendering (e.g., increasing as depicted by the corresponding value of the iteration frequency field 348).

In some embodiments, the corresponding listing values 312 may include values associated with asynchronous tendering preferences (e.g., corresponding to optional parameters that may alter the scope of the iterative comparison). For example, the corresponding listing values 312 may include a value corresponding to the geographical (i.e., the general desired region in which a corresponding counterparty to a potential transaction is located) preferences (e.g., rocky mountain as depicted by the corresponding value of geography field 352).

In other embodiments, the create listing object button 304 may include conditions parameters button 322. The condition parameters button 322 may be operable to facilitate the asynchronous tendering with respect to a condition-dependent status of the variable characteristic asset. That is, the condition parameters button 322 may include various listing parameters 308 that include values indicative of the preferences of a hypothetical seller with regards to the condition of the variable characteristic asset. In this regard, the created listing object (e.g., created via create listing object button 304) may be iteratively compared with an offer object in relation to a condition of the variable characteristic asset and parameters related thereto (e.g., verification method of an asserted condition of a variable characteristic asset).

For example, the condition parameters button 322 may include a target condition field 324. In this regard, the corresponding value of target condition field 324 may include a value indicative of the hypothetical seller's asserted condition of the indicated part (e.g., "fair" as depicted by the corresponding value of condition field 324). The condition parameters button 322 may also include a verification field 326. In this regard, the corresponding value of the verification field 326 may include a value indicative of the hypothetical seller's method of verification of the asserted condition of target condition field 324 (e.g., "appraisal" as depicted by the corresponding value of verification field 326). In this regard, the verification field 326 may allow the hypothetical seller to assert a range of verification methods, including: none (i.e., no verification method), appraisal, audit, reputation, and the like according to any one of a variety of user-defined and preprogrammed criteria. The condition parameters button 322 may also include a flexible search field 356. In this regard, the corresponding value of the flexible search field 356 may include a value indicative of the hypothetical seller's preference to iteratively compare the created listing order object with an offer object of slightly differing (i.e., non-matching) parameters (e.g., "yes" as depicted by the corresponding value of flexible search field 356).

Create listing object button 304 may also include a begin button 360. Upon entering the various values of the corresponding listing values 312, the initiation of the begin button 360 may facilitate the initiation of the asynchronous tendering of the indicated part (e.g., via the iterative comparison of the created listing object with a corresponding offer object).

Turning next to FIG. 4, a screen shot 400 is depicted in which the create offer object button 404 has been manipulated such that a hypothetical buyer may create an offer object for use in the asynchronous tendering of a variable characteristic assets (e.g., by populating one or more data fields with information specific to the creation of a desired offer object). Accordingly, the screenshot 400 may include a plurality of offer parameters 408 associated with the creating of an offer object. Each of the offer parameters 408 may facilitate the asynchronous tendering of variable characteristic assets by, for example, defining various applicable criteria for iterative comparison (e.g., including information associated with the variable characteristic asset, such as the part number and description, and the character of the iterative comparison of the asynchronous tending, such as the price increments and the iteration frequency). In this regard, each of the offer parameters 408 may be associated with a corresponding offer value 412. In this regard, the corresponding offer value 412 may be modifiable by the user according to the particular applicable criteria desired. It will be appreciated, that offer parameters 408 may include any appropriate criteria to create an offer object for the facilitation of the asynchronous tendering of variable characteristic assets, including mandatory criteria, optional criteria, variable criteria, or any other user-modifiable criteria. According to one embodiment, the offer parameters 408 may include a part number field 416, a description field 420, an initial price field 428, a final price field 432, a start time field 436, an end time field 440, a price increments field 444, an iteration frequency field 448, and/or a geography field 452. Additionally, the offer parameters 408 may include offer parameters associated with a conditions parameters button 422, discussed in greater detail below. In this regard, the offer parameters 408 may further include a target condition field 424, a verification field 426, and/or a flexible search field 456. For the sake of illustration, reference will now be made to the corresponding values 412 of the parameters 408, as depicted in screenshot 400 to demonstrate the creation of an offer object. In this regard, a hypothetical buyer of a variable characteristic asset may create an offer object (e.g., for iterative comparison via the asynchronous tendering methodology disclosed herein) for a part number 10578 (e.g., as depicted by the corresponding value of part number field 416). Accordingly, each of the corresponding offer values 412 may be populated according to the desired characteristics of the asynchronous tendering for the part number 10578 (the "indicated part" for purposes of discussion). This may include, for example, a description of the indicated part (e.g., mechanical seal of a 5 inch diameter as depicted by the corresponding value of description field 420). The corresponding offer values 412 may also include a value corresponding to the initial price (i.e., the price at which the hypothetical buyer may be willing to purchase the indicated part at the start of the asynchronous tendering) of the indicated part (e.g., $75,000 as depicted by the corresponding value of initial price field 428) and a value corresponding to the final price (i.e., the price at which the hypothetical buyer may be willing to purchase the indicated part at the end of the asynchronous tendering) of the indicated part (e.g., $105,000 as depicted by the corresponding value of final price field 436).

Furthermore, the corresponding listing values 412 may also include a value corresponding to the start time (i.e., the time at which the hypothetical buyer wishes to initiate the asynchronous tendering) of the indicated part (e.g., Mar. 7, 2015 at 4 PM as depicted by the corresponding value of the start time field 436) and a value corresponding to the end time (i.e., the time at which the hypothetical buyer wishes to terminate the asynchronous tendering) of the indicated part (e.g., Mar. 10, 2015 at 2 PM as depicted in the end time field 444). In this regard, the corresponding listing values 412 may also include values operable to manipulate the iterative comparison of the asynchronous tendering. For example, the corresponding listing values 412 may include a value corresponding to the variation in price increments (i.e., indicative of the magnitude of the change in price for each iteration of the iterative comparison) for the course of the asynchronous tendering (e.g., stepwise as depicted by the corresponding value of the price increments field 444). Additionally, the corresponding listing values 412 may include a value corresponding to the iteration frequency (i.e., the interval at which price changes) over the duration of the asynchronous tendering (e.g., increasing as depicted by the corresponding value of the iteration frequency field 448). It will be appreciated that any time profile can be supported. For example, buyers and sellers may select a series of times and prices. Thus, references to a "periodic" changes are not meant to suggest limitation to regular or repeating intervals.

In some embodiments, the corresponding listing values 412 may include values associated with asynchronous tendering preferences (e.g., corresponding to optional parameters that may alter the scope of the iterative comparison). For example, the corresponding listing values 412 may include a value corresponding to the geographical (i.e., the general desired region in which a corresponding counter-party to a potential transaction is located) preferences (e.g., rocky mountain as depicted by the corresponding value of geography field 452).

In other embodiments, the create offer button 404 may include conditions parameters button 422. The condition parameters button 422 may be operable to facilitate the asynchronous tendering with respect to a condition-dependent status of the variable characteristic asset. That is, the condition parameters button 422 may include various listing parameters 408 that include values indicative of the preferences of a hypothetical buyer with regards to the condition of the variable characteristic asset. In this regard, the created offer object (e.g., created via create offer object button 404) may be iteratively compared with a listing object in relation to a desired condition (or range of conditions) of the variable characteristic asset and parameters related thereto (e.g., desired verification method for a seller's asserted condition of the variable characteristic asset).

For example, the condition parameters button 422 may include a target condition field 424. In this regard, the corresponding value of target condition field 424 may include a value indicative of the hypothetical buyer's desired condition (or range of conditions) of the indicated part (e.g., "fair" as depicted by the corresponding value of condition field 424). The condition parameters button 422 may also include a verification field 426. In this regard, the corresponding value of the verification field 426 may include a value indicative of the hypothetical buyer's preferred method of verification of the seller's asserted condition of the variable characteristic asset (e.g., "appraisal" as depicted by the corresponding value of verification field 426). In this regard, the verification field 426 may allow the hypothetical buyer the option to assert a desired manner in which the condition of a seller's variable characteristic asset is verified. The condition parameters button 422 may also include a flexible search field 456. In this regard, the corresponding value of the flexible search field 456 may include a value indicative of the hypothetical buyer's preference to iteratively compare the created offer object with a listing object of slightly differing (i.e., non-matching) parameter (e.g., "yes" as depicted by the corresponding values of flexible search field 356).

Create listing object button 404 may also include a begin button 460. Upon entering the various values of the corresponding offer values 412, the initiation of the begin button 460 may facilitate the initiation of the asynchronous tendering of the indicated part (e.g., via the iterative comparison of the created listing object with a corresponding offer object).

C. Asynchronous Tendering Facilitation

Figure 5:
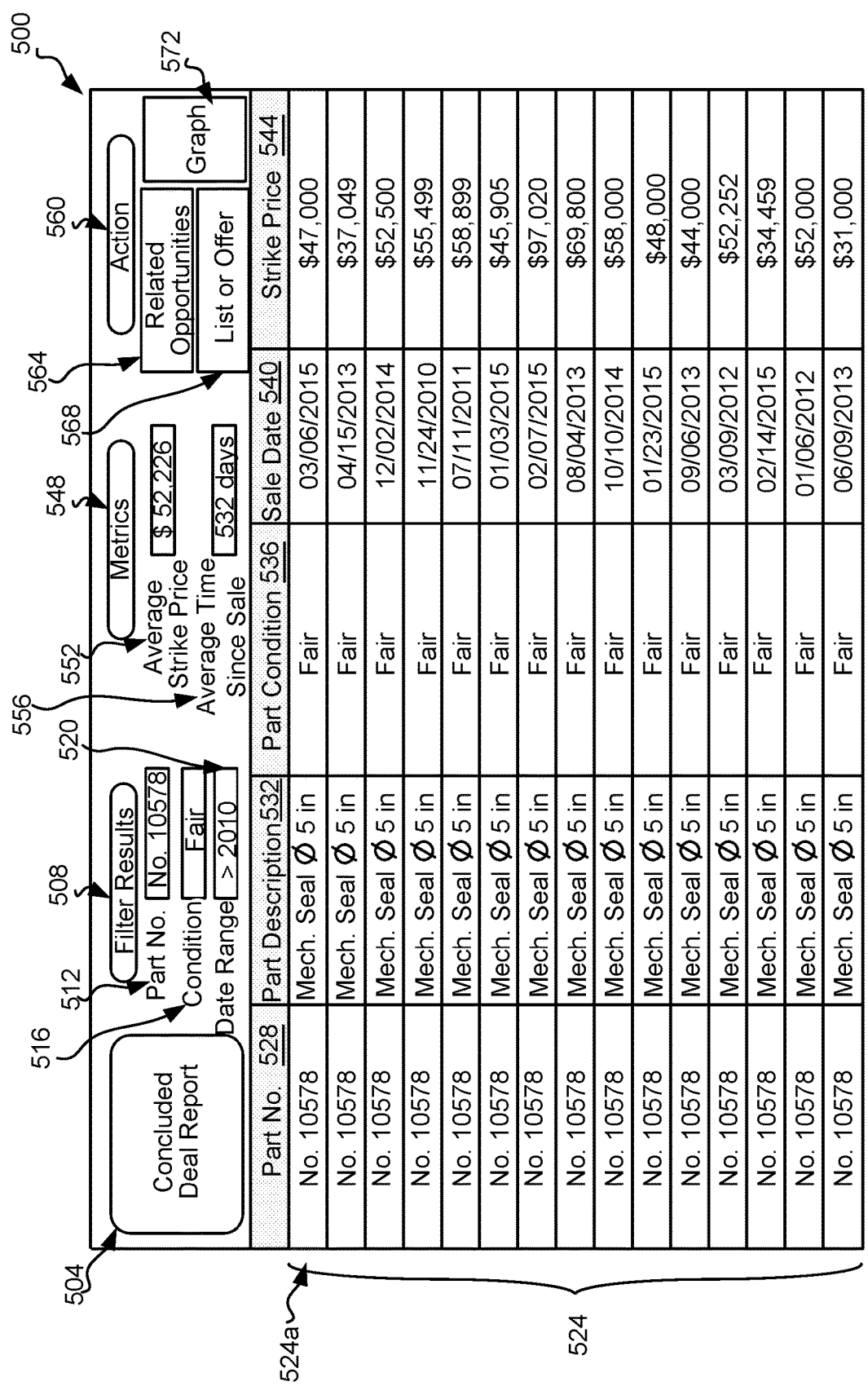

Turning next to FIG. 5, screenshot 500 is depicted in which Concluded Deal Report 504 is displayed. Broadly, the Concluded Deal Report 504 may include information associated with previously completed transactions completed via the asynchronous tendering. In this regard, the Concluded Deal Report 504 may facilitate, for example, the determination of an appropriate listing price for a variable characteristic asset of a created listing object by displaying information of analogous completed transactions (e.g., such as information associated with a strike price and other various characteristics of the previously completed transactions). That is, a hypothetical seller may wish to create a listing object for the asynchronous tendering of a variable characteristic asset with values (e.g., corresponding listing values 312, etc.) comparable to current market conditions. In this regard, the Concluded Deal Report 504 may represent current market conditions by displaying information associated with actual completed transactions, filterable according to any manner of user-entered or preprogrammed criteria.

That is, the Concluded Deal Report 504 may be filtered in order to display market conditions for a particular variable characteristic asset. For example, the Concluded Deal Report 504 may include a filter results button 508 operable to filter the Concluded Deal Report 504 according to the user-entered or preprogrammed criteria. According to one embodiment, the filter results button 508 may facilitate filtering the Concluded Deal Report 504 by part number filter 512, condition filter 516, and/or date range filter 520. In other embodiments, the filter results button 508 may include additional filter criteria. In any event, the filter results button 508 may be manipulated to adjust the scope or extent of information displayed at Concluded Deal Report 504. In this regard, screenshot 500 in embodiment in which Concluded Deal Report 504 has been filtered to display the previously completed transactions associated with part number 10578 (e.g., as depicted in parts number filter 512) of a "fair" condition (e.g., as depicted in condition filter 516) for any previously completed transactions completed after the year 2010 (e.g., as depicted in date range filter 520). In some instances, the filter results button 508 may be manipulated by a user in order to update the previously completed transaction displayed at the Concluded Deal Report 504.

The Concluded Deal Report 504 may include a concluded deal report display 524 for presenting the data associated with the previously completed transactions of the Completed Deal Report 504. That is, the Concluded Deal Report 504 may display various completed transactions at concluded deal report display 524 associated with the previously completed transactions corresponding to the values of the filter results button 508. As such, the concluded deal report display 524 may include a part number column 528, a part description column 532, a part condition column 536, a sale date column 540, and/or a strike price column 544. Consider, for the sake of illustration, row 524a of concluded deal report display 524, which displays various informational attributes associated with a particular previously completed transaction that corresponds to the values of the filter results button 508. As such, row 524a indicates a particular previously completed transaction of part number 10578 (e.g., according to part number column 528) for a mechanical seal of a 5 inch diameter (e.g., according to part description column 532) of a "fair" condition (e.g., according to part condition column 536). Additionally, row 524a indicates that the particular previously completed transaction of row 524a included a strike price of $47,000 (e.g., according to strike price column 544) for a transaction that concluded on Mar. 6, 2015 (e.g., according to the sale date column 540).

A number of various metrics may be generated at the Concluded Deal Report 504 with respect to the previously completed transactions of the concluded deal report display 524. In one embodiment, the Concluded Deal Report 504 may include metrics generated via a metrics button 548. In this regard, the metrics button 548 may be operable to facilitate the display of information associated with an analysis of the previously completed transactions of the concluded deal report display 524. For example, according to one embodiment, the metrics button 548 may include an average strike price field 552, and an average time since sale field 556. In this regard, the average strike price field 552 may be operable to display a value indicative of the average value of the strike price for the previously completed transactions displayed at concluded deal report display 524. Additionally, the average time since sale field 556 may be operable to display a value indicative of the average time since the completion of the previously completed transaction displayed at concluded deal report display 524. Notably, the metrics button 548 may include additional metrics not necessarily shown in screenshot 500. In any event, the metrics associated with metrics button 548 may facilitate analyzing the current market conditions, for example, of previously completed transactions corresponding to the values of the filter results button 508.

According to the example depicted in screenshot 500, the previously completed transactions of the concluded deal report display 524 include an average strike price of $52,226 (e.g., as depicted in average strike price field 552). The market conditions may be assessed with respect to the average time since the last sale (e.g., to illustrate the relevance of the displayed average strike price). The example depicted in screenshot 500, includes an average time since sale of 532 days (e.g., as depicted in average time since sale field 556). That is, average strike price of $52,226 corresponds to completed transactions that, on average, completed 532 days prior to the present time at which the Concluded Deal Report 504 is displayed.

As previously stated, the Concluded Deal Report 504 may facilitate the analysis of current market conditions associated with a particular identified set of criteria (e.g., one or more of the values of filter results button 508, such as a part number, a condition value, and/or a date range). In this regard, the previously completed transactions and associated metrics of the Concluded Deal Report 504 may be viewed in conjunction with various anticipated, user-initiated actions. Accordingly, Concluded Deal Report 504 may include an action section 560 to coordinate the display of various potential user-initiated actions in relation to the information associated with Concluded Deal Report 504. For example the action section 560 may include a related opportunities button 564. The related opportunities button 564 may be manipulated in order to facilitate the display of analogous open transactions (e.g., those that are not completed and currently pending). In this regard, the metrics presented in the Concluded Deal Report 504 may be compared with associated properties of analogous open transactions, for example, in order to facilitate the assessment of the present market conditions and/or to initiate a transaction. With respect to the example presented in screenshot 500, the related opportunities button 564 may facilitate the presentation of open transactions with respect to the values at the filter results button 508. That is, the related opportunities button 564 may present open transactions associated with a part number of 10578 of a fair condition.

Additionally, the action section 560 may include a list or offer button 568. The list or offer button 568 may be manipulated in order to facilitate the creation of a listing object and/or the creation of an offer object (e.g., such as that presented previously in FIGS. 3 & 4). That is, as the previously completed transactions of the concluded deal report display 524 may inform a user's decision to create a listing object or offer object, the Concluded Deal Report 504 includes list or offer button 568 in order to facilitate the creation thereof. According to yet another embodiment, information of concluded deal report display 524 may be graphed via manipulation of the graph button 572. For example, manipulation of the graph button 572 may display the various completed transactions of concluded deal report display 524 in terms of a line graph, such that the strike price for each of the completed transactions may be plotted on a y-axis for each of a corresponding sale date plotted along an x-axis to indicate the variations in the various strike prices over time. In yet other embodiments, different graphical representations of the previously completed transactions of the Concluded Deal Report 504 may be available consistent with the disclosure herein.

Figure 6:
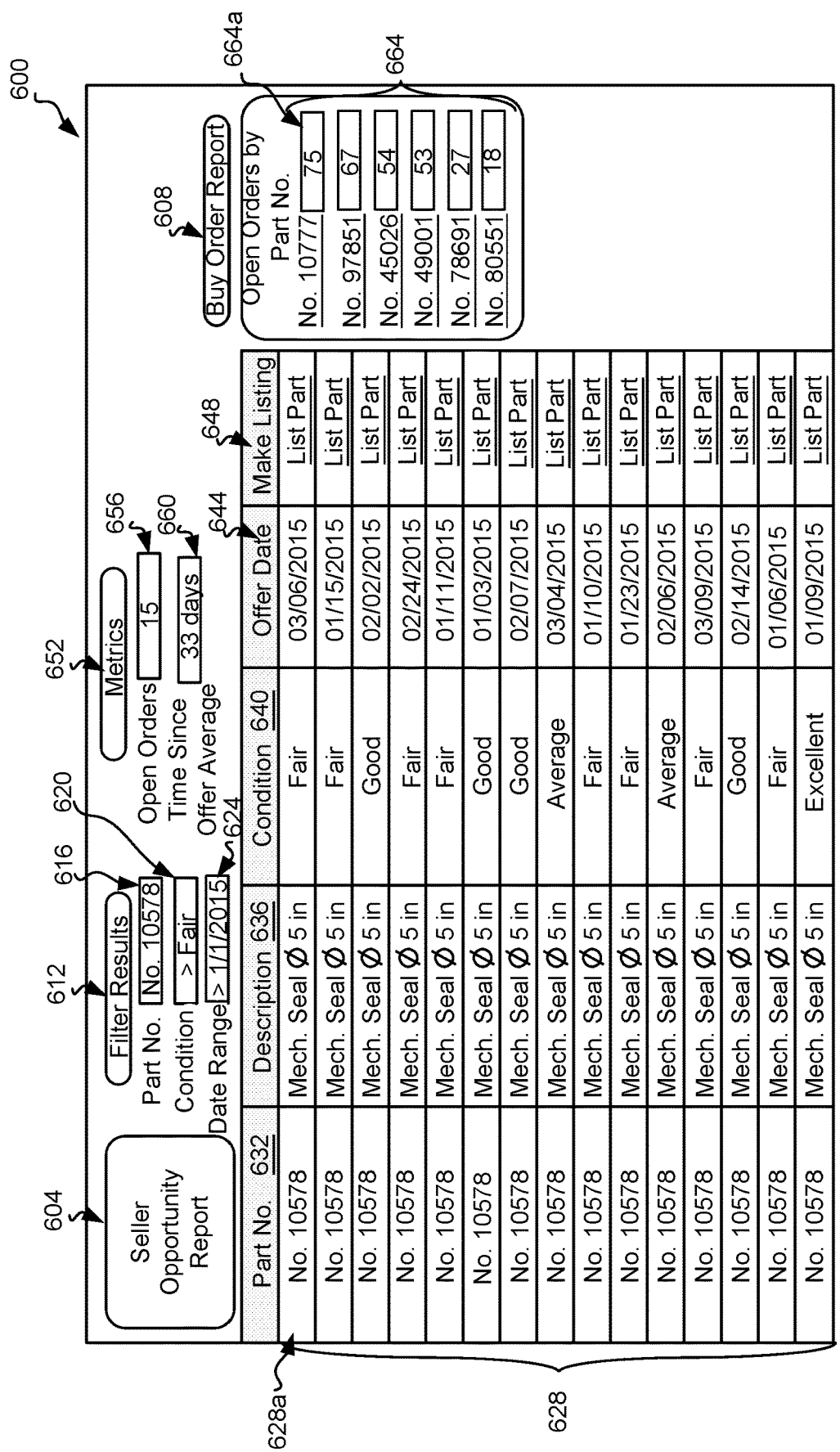

Turning next to FIG. 6, screenshot 600 is depicted in which Seller Opportunity Report 604 and Buy Order Report 608 are displayed. Broadly, the Seller Opportunity Report 604 may include information associated with open offer transactions (e.g., variable characteristic assets of an offer object in which a time-dependent price range has not yet been determined via the iterative comparison). The open offer transaction may be open for a variety of reasons, including that a corresponding seller (i.e., a corresponding listing object) has not yet been identified. In this regard, the Seller Opportunity Report 604 may facilitate the display of presently unmet market demand (e.g., each open offer transaction may represent an unmet demand for a particular variable characteristic asset). Accordingly, the Seller Opportunity Report 604 may present various opportunities for a hypothetical seller to meet the displayed unmet market demand.

In this regard, the Seller Opportunity Report 604 may include a filter results button 612. The filter results button 612 may be operable to filter the open offer transactions according to various specified criteria. Accordingly, the filter results button 612 may include a part number filter 616, a condition filter 620, and/or a date range filter 624. In this regard, the open offer transactions of the Seller Opportunity Report 604 may be displayed according to these and/or other criteria. For example, according to the embodiment of screenshot 600, the filter results button 612 has been manipulated such that the Seller Opportunity Report 604 is filtered to display open offer transactions corresponding to offer objects with a part number of 10578 (e.g., as depicted in part number filter 616), of a "fair" or better condition (e.g., as depicted in condition filter 620) that have been first offered since Jan. 1 of 2015 (e.g., as depicted in date range filter 624).

As such, the Seller Opportunity Report 604 may include open offer transactions corresponding to the values associated with the filter results button 612. In this regard, the seller opportunity report 604 may include seller opportunity report display 628. The seller opportunity report display 628 may include a listing of each open offer transaction corresponding to the values of the filter results button 612. As such, the data associated with each open offer transaction may be displayed in seller opportunity report display 628 according to various non-exhaustive data columns. For example, seller opportunity report display 628 may include a part number column 632, a part description column 636, a part condition column 640, an offer date column 644, and a make listing column 648. According to the example in screenshot 600, seller opportunity report display 628 may include a row 628a that corresponds to a particular open offer transaction of a part number 10578 (e.g., as depicted in part number column 632), for a mechanical seal of 5 inches (e.g., as depicted in part description column 636), of a "fair" condition (e.g., as depicted in part condition column 640). Additionally, row 628a indicates that the offer for this particular open offer transaction was initiated on Mar. 6, 2015 (e.g., as depicted in offer date column 644). Notably, row 628a includes the option to "list part" (e.g., as depicted in make listing column 648). In this regard, by manipulation of the link in the make listing column 648 of row 628a, the Seller Opportunity Report 604 may facilitate the creation of a listing object associated with the particular open offer transaction of row 628a. In this regard, a hypothetical seller, may propose to initiate in asynchronous tendering iterative comparison with a hypothetical buyer of the open offer transaction. Importantly, the identity of the hypothetical seller and the hypothetical buyer may be anonymized to facilitate the accurate and good faith asynchronous tendering.

The Seller Opportunity Report 604 may also include a metrics button 652 to facilitate the analysis of the open offer transaction displayed in the seller opportunity report display 628 (e.g., the open offer transactions corresponding to the values at the filter results button 612). In this regard, the metrics button 652 may be operable to display an open orders average 656, and a time since offer average 660. The open order average 656 may include the total number of open offer transactions displayed in the seller opportunity report display 628. As such, the open order average 656 may be indicative of the relative unmet demand for various variable characteristic assets (e.g., such as that of part number filter 616). That is, in the example presented in screenshot 600, 15 open offer transactions are displayed in seller opportunity report display 628 (e.g., 15 open offer transactions correspond to a part number of 10578 with a condition greater than "fair" for an initial offer date of greater than Jan. 1 of 2015). Furthermore, the time since offer average 660 may include in average time since the initial offer date of the open offer transactions displayed at seller opportunity report display 628. As such, the time since offer average 660 may be indicative of the period for unmet demand. That is, in the example presented in screenshot 600, the time since offer average 660 for the open offer transaction of seller opportunity report display 628 is 33 days.

As noted, the screenshot 600 also depicts Buy Order Report 608. The Buy Order Report 608 may be operable to indicate the quantity of open offer transactions for a given part number. For example, the Buy Order Report 608 may include a buy order report display 664. According to the example of screenshot 600, the buy order report display 664 may present the quantity of open offer transactions according to part number. That is, the buy order report display 664 may list the quantity of open offer transactions associated with each of a particular part number. For example, the buy order report display 664 may include row 664a, which corresponds to a part number of 10777, which is associated with 77 open offer transactions. In some instances, the buy order report display 664 may list the quantity of open offer transactions associated with each of a particular part number in decreasing order. In this regard, the buy order report display 664 may indicate the relative unmet demand for each of a plurality of particular part numbers. Additionally, the part number of the buy order report display 664 may be manipulated to display a corresponding Seller Opportunity Report corresponding to the particular manipulated part number. For example, manipulation of the part number 10777 of row 664a may initiate the display of a Seller Opportunity Report associated with part number 10777 (e.g., the presentation of a report that displays each particular open offer transaction for the part number 10777).

It will be appreciated that while the Buy Order Report 608 is presented along with Seller Opportunity Report 604 at screenshot 600, the Buy Order Report 608 need not be presented together with Seller Opportunity Report 604. That is, in some cases, the Buy Order Report 608 may be viewed separate or remote from the Seller Opportunity Report 604. Moreover, additional reports and metrics consistent with the foregoing teachings are embodied in the disclosure herein (e.g., a buyer opportunity report, a part condition report, a geographic report, and/or any report to facilitate the creation of listing and or offer objects in the asynchronous tendering of variable characteristic assets thereof).

Figure 7:
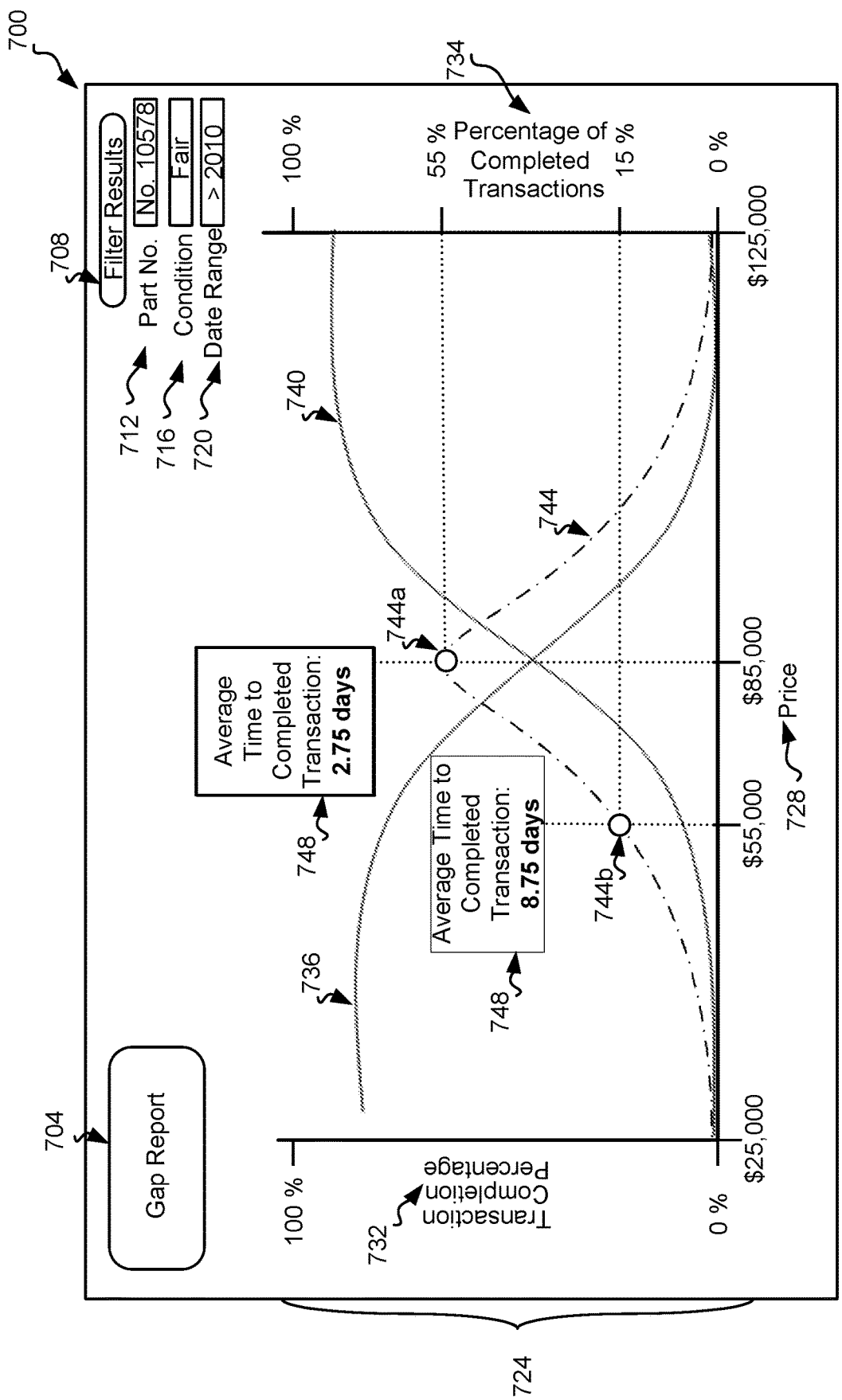

Turning next to FIG. 7, screenshot 700 is depicted in which Gap Report 704 is displayed. Broadly, the Gap Report 704 may include information associated with successful and unsuccessful offer prices and listing prices of previously completed and/or attempted transactions. In this regard, the Gap Report 704 may represent market conditions for a particular variable characteristic asset in part by presenting historical data corresponding to successful and/or unsuccessful listing prices and offer prices. Accordingly, the Gap Report 704 may be used to inform the creation of a listing object and/or an offer object. That is, according to one embodiment, the Gap Report 704 may be indicative of various aggregated minimum and maximum offer prices and listing prices historically received for a particular variable characteristic asset, according to one or more data filters as discussed below. Correspondingly, the Gap Report 704 may indicate a transaction completion percentage for each of the aggregated minimum and maximum offer prices and listing prices, as discussed in greater detail below. Additionally, the Gap Report 704 may include information indicative of the rate of occurrence of a particular strike price for variable characteristic asset.

To facilitate the foregoing, the Gap Report 704 may include a filter results button 708. The filter results button 708 may be operable to filter the Gap Report 704 such that the Gap Report 704 includes aggregate information according to the values specified at the filter results button 708. As such, the filter results button 708 may include a part number filter 712, a condition filter 716, and/or a date range filter 720. According to the example in screenshot 700, the Gap Report 704 may include aggregate information associated with part number 10578 (e.g., as depicted in part number filter 712), of a "fair" condition (e.g., as depicted in condition filter 716) for transactions initiated since 2012 (e.g., as depicted in date range filter 720).

In this regard, the Gap Report 704 may include a gap report graph 724 to graphically display the transaction completion percentage for each of the aggregate offer prices and listing prices (i.e., the percentage of listing objects or offer objects that resulted in a completed transaction at the indicated price). The Gap Report graph 724 may also indicate the percentage of completed transactions for each of the aggregated strike prices. In this regard, the gap report graph 724 may include a price axis 728 (e.g., extending generally along an x-axis), a transaction completion percentage axis 732 (e.g., extending generally along a primary y-axis), and a percentage of completed transactions axis 734 (e.g., extending generally along a secondary y-axis).

The gap report graph 724 may include a plurality of graphical lines indicative of the market conditions associated with the aggregated transactions in relation to the selected values of the filter results button of 708. For example, gap report graph 724 may include aggregated listing price line 736 (graphed with respect to transaction completion percentage axis 732), aggregated offer price line 740 (graphed with respect to transaction completion percentage axis 732), and aggregated strike price line 744 (graphed with respect to percentage of completed transactions axis 734). The aggregated listing price line 736 may indicate the historical transaction completion percentage for a particular listing price. That is, for a given listing price (e.g., at the price axis 728) the listing price line 736 may indicate (e.g., at the transaction completion percentage axis 732) the percentage of transactions completed at that price. According to one embodiment, a lower listing price may correspond to a relatively high percentage of transactions completed (e.g., a hypothetical seller willing to sell the indicated part for a relatively low price as compared to a market price may be indicative of a relatively high likelihood of the transaction completing) and a higher listing price may correspond to a relatively low percentage of transactions completed (e.g., a hypothetical seller willing to sell the indicated part for a relatively high price as compared to a market price may be indicative of a relatively low likelihood of the transaction completing).

Correspondingly, the aggregated offer price line 740 may indicate the historical transaction completion percentage for a particular offer price. That is, for a given offer price (e.g., at the price axis 728) the offer price line 740 may indicate (e.g., at the transaction completion percentage axis 732) the percentage of historical transactions completed at that price. In this regard, according to one embodiment, a lower offer price may correspond to a relatively low percentage of transactions completed (e.g., a hypothetical buyer willing to buy the indicated part for a relatively low price as compared to a market price may be indicative of a relatively low likelihood of the transaction completing) and a higher offer price may correspond to a relatively high percentage of transactions completed (e.g., a hypothetical buyer willing to buy the indicated part for relatively high price as compared to a market price may be indicative of a relatively high likelihood of the transaction completing).

The gap report graph 724 may also include an aggregated strike price line 744. The aggregated strike price line 774 may indicate the percentage of completed transactions that included a particular strike price (i.e., the rate of occurrence of a particular strike price). That is, the gap report graph 724 may facilitate the determination of market conditions for an indicated part (e.g., as indicated via the values of the filter results button 708) by displaying the rate of occurrence of strike prices for completed transactions over a range of possible values. According to one embodiment, the distribution of strike prices over a range of possible values may correspond to a substantially normal distribution. In this regard, only a small percentage of completed transactions may have a strike price at a relatively high or low price (i.e., very few transactions may be completed with a relatively low or a relatively high strike price). In contrast, however, a relatively high percentage of transactions may occur at some price between the relatively low price and the relatively high price. Accordingly, the aggregated strike price line 744 may facilitate the determination of market conditions for a particular indicated part by displaying the strike price corresponding to the most frequent strike price.

For example, according to the embodiment of screenshot 700, the aggregated strike price line 744 may indicate that 55% of completed transactions associated with the gap report graph 724 resulted in a strike price of $85,000 (e.g., as depicted by aggregated strike price line point 744a). In this regard, $85,000 may represent the most common strike price for the completed transactions associated with the gap report graph 724. As depicted with regards to the general normal distribution of the aggregated strike price line 744, a strike price of either less than or more than $85,000 may correspond to the historical completion of substantially fewer transactions.

The gap report graph 724 may also include a completed transaction time metric 748. The completed transaction time metric 748 may be operable to display, for a particular strike price, the average length of time historically required for the transaction to complete (i.e., the duration between the initiation of the iterative comparison and the mutual acceptance of a returned strike price by a buyer and seller). In one embodiment, the completed transaction time metric 748 may be represented in a box superimposed over the gap report graph 724 and manipulable across a plurality of lateral positions along the price axis 728 with respect to the values of aggregate strike price line 744. As such, a user may position the completion transaction time metric 748 at various strike prices of the completed transactions such that the completion time metric 748 may display the average time to a completed transaction for the corresponding strike price. In this regard, the competed transaction time metric 748 may facilitate the analysis of market conditions for a particular set of completed transactions by providing an indication of the amount of time it may require to reach a particular strike price. As such, and when viewed in conjunction with the percentage of completed transaction data of the aggregate strike price line 744, a user may ascertain the potential benefits and drawbacks of creating an listing object and/or an offer object based on both, or at least one, of the percentage of completed transactions that resulted in a given strike price as well as the amount of time historically required to reach a completed transaction for the given strike price.

To illustrate, consider the gap report graph 724 of screen shot 700. A user may consult this graph, for example, to analyze the market conditions associated with a part number 10578 of "fair" condition with respect to corresponding initiated transaction occurring since 2010 (e.g., as depicted with respect to the values selected in the filter results button 708). As noted above, given the filtered conditions, 55% of completed transactions may have resulted in a strike price of $85,000. In turn, the completed transaction time metric 748 may indicate that the average time to a completed transaction that included in a strike price of $85,000 was approximately 2.75 days. Assuming the user is a buyer who wishes to acquire the part for less than $85,000, the user may compare the various metrics associated with the strike price of $85,000 with a lower price, for example, such as a strike price of $55,000 as depicted in aggregated strike price line point 744b. As depicted in screenshot 700, aggregated strike price line point 744b indicates that a strike price of $55,000 accounted for approximately 15% of completed transactions. Additionally, and with reference to the completed transaction time metric 748, completed transactions that included a strike price of $55,000 typically required 8.75 days to complete. In this regard, the user may create, for example, an offer object tailored to the particular needs of the user with reference to the information of the Gap Report 704 (e.g., if the user does not need the part urgently, a price around the $55,000 may be selected, however, if the part is needed sooner, a price around the $85,000 (or higher) may be selected).

III. Illustrative Methods

Figure 8:
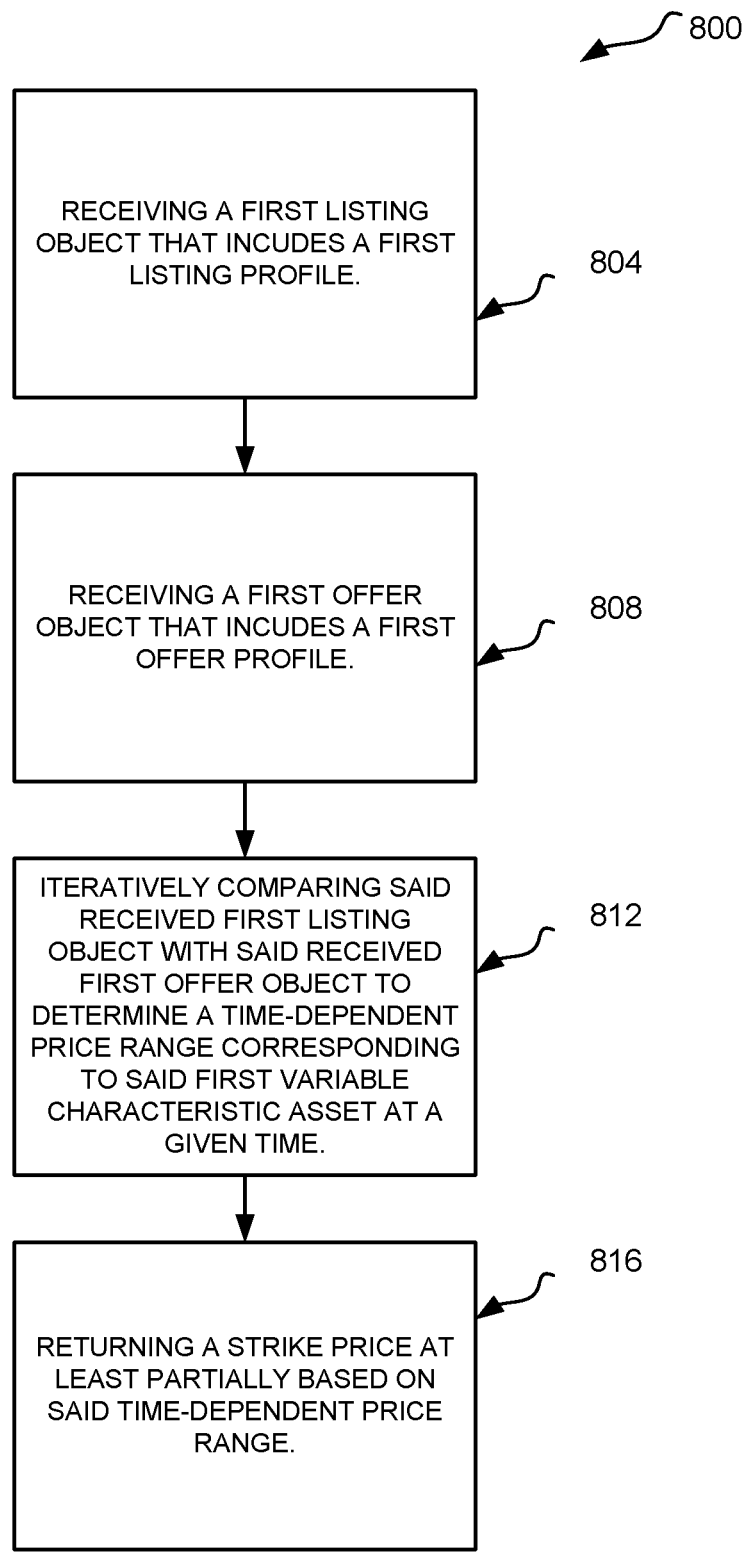
FIG. 8 illustrates a flow diagram of an embodiment of a method for use in asynchronous tendering for variable characteristic assets.
Figure 9:
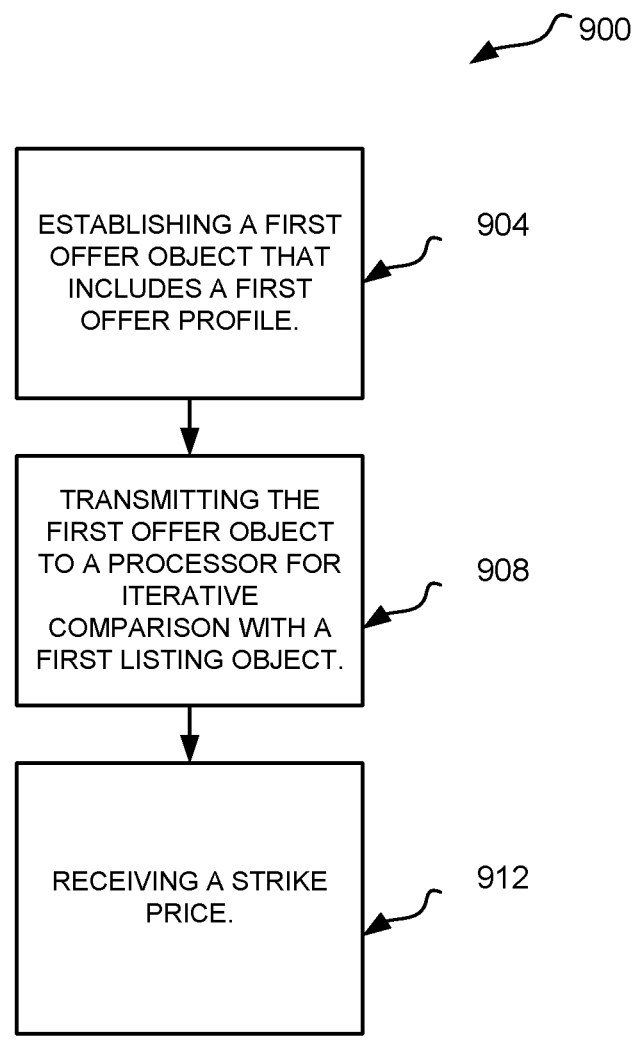
FIG. 9 illustrates a flow diagram of a method for use in asynchronous tendering for variable characteristic assets, according to another embodiment.
Figure 10:
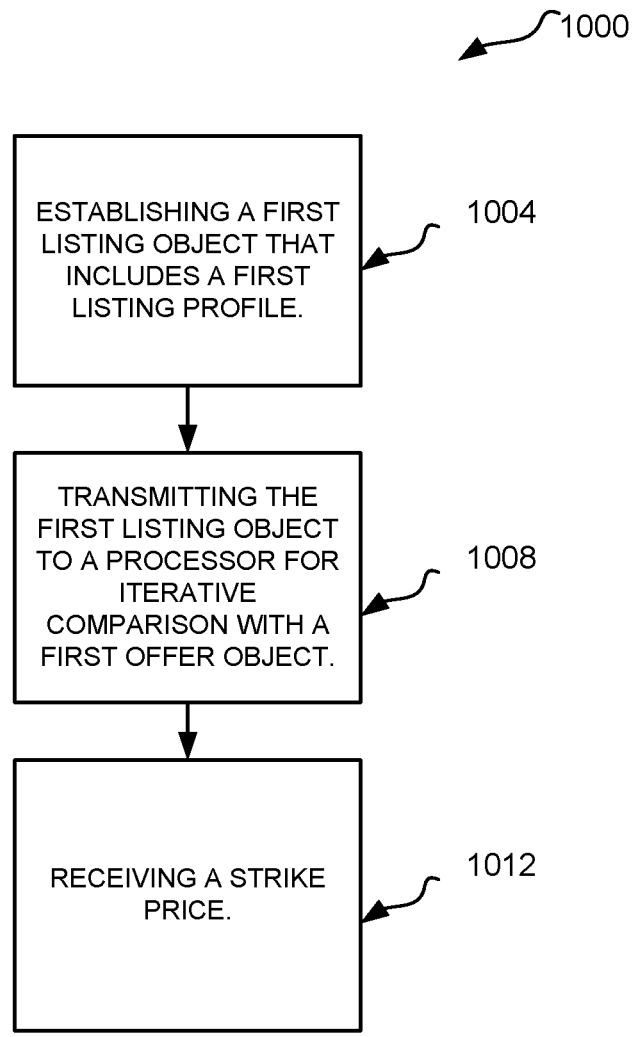
FIG. 10 illustrates a flow diagram of a method for use in asynchronous tendering for variable characteristic assets, according to another embodiment.

To further facilitate the reader's understanding of the various functionalities of the embodiments disclosed herein, reference is now made to flow diagrams in FIGS. 8, 9, and 10, which respectively illustrate method 800, 900, 1000 for use in the asynchronous tendering of variable characteristic assets within a distributed network. While specific steps (and orders of steps) of methods 800, 900, and 1000 have been illustrated and will be discussed, other methods (including more, fewer, or different steps than those illustrated) consistent with the teaching presented herein are also envisioned and encompassed with the present disclosure.

With initial reference to FIG. 8 method 800 relates generally to the asynchronous tendering of variable characteristic assets within a distributed network. In this regard, method 800 presents various process steps to facilitate the asynchronous tendering, for example, via a processor on a network server (e.g., network server 116). As such, method 800 may include receiving 804 a first listing object that includes a first listing object profile (e.g., received listing object 104). The first listing profile may be indicative of a listing price corresponding to a first variable characteristic asset. The method 800 may further include receiving 808 a first offer object that includes a first offer profile (e.g., received offer object 108). Analogous to the first listing object, the first offer object may be indicative of an offer price corresponding to the first variable characteristic asset. Notably, at least one of the listing price and the offer price may include a time-dependent price. In this regard, a processor of a network may therefore receive both the listing price of the first listing object and the offer price of the first offer object to facilitate the asynchronous tendering of the first listing object and the first offer object.

The method 800 may further include iteratively comparing 812 the received first listing object with the received first offer object to determine a time-dependent price range corresponding to the first variable characteristic asset at a given time (e.g., via operation of the iterative comparator engine 156). In this regard, the processor of the network server may be operable to compare, in iterative fashion, the first listing object and the first offer object. In part because at least one of the listing price and the offer price may include a time-dependent price, the iterative comparison may proceed asynchronously. In this regard, the iterative comparison may continue to determine a particular time-dependent price range for the first listing object and the first offer object such that the time-dependent price range may be bounded by the listing price at a minimum value at the given time and the offer price at a maximum value at the given time. The method 800 may further include returning 816 a strike price at least partially based on the time-dependent price range (e.g., returned via portal 188). Accordingly, the processor of the network server may be operable to return the strike price to each party associated with the first listing object and the first offer object. Notably, the returned strike price may be valid for a particular cooperatively defined time window based at least in part on the time-dependent price of at least one of the listing price of the offer price (e.g., the time-dependent price of at least one of the listing price and the offer price may correspond to an acceptable price for a limited duration).

Turning next to FIG. 9, method 900 relates generally to the asynchronous tendering of variable characteristic assets within a distributed network. In this regard, method 900 presents various process steps to facilitate creating and transmitting a first offer object in order to receive a strike price corresponding to the asynchronous tendering of the created first offer object. As such, method 900 may include establishing 904 a first offer object that includes a first offer profile. The established first offer profile may be indicative of an offer price corresponding to a first variable characteristic asset. The method 900 may further include transmitting 908 the first offer object to a processor for iterative comparison with a first listing object. In this regard, the established first offer object may be transmitted over one or more networks of a distributed network to a processor of a network server via a network server portal for the iterative comparison. Accordingly, the iterative comparison may determine a particular time-dependent price range for the first listing object and the first offer object such that the time-dependent price range may be bounded by the listing price at a minimum value at the given time and the offer price at a maximum value at the given time. The processor of the network server may include a first listing object, including a first listing profile indicative of a listing price that corresponds to the first variable characteristic asset. Notably, at least one of the listing price and the offer price may include a time-dependent price. The method 900 may further include receiving 912 a strike price. In this regard, a user, for example, associated with the established first offer object may receive a strike price based on the iterative comparison.

Turning next to FIG. 10, method 1000 relates generally to the asynchronous tendering of variable characteristic assets within a distributed network. In this regard, method 1000 presents various process steps to facilitate creating and transmitting a first listing object in order to receive a strike price corresponding to the asynchronous tendering of the created first listing object. As such, the method 1000 may include establishing 1004 a first listing object that includes a first listing profile. The established first listing profile may be indicative of a listing price corresponding to a first variable characteristic asset. The method 1000 may further include transmitting 1008 the first listing object to a processor for iterative comparison with a first offer object. In this regard, the established first listing object may be transmitted over one or more networks of a distribute network to a processor of a network server via a network server portal for the iterative comparison. Accordingly, the iterative comparison may determine a particular time-dependent price range for the first listing object and the first offer object such that the time-dependent price range may be bounded by the listing price at a minimum value at the given time and the offer price at a maximum value at the given time. The processor of the network server may include a first offer object, including a first offer profile indicative of an offer process that corresponds to the first variable characteristic asset. Notably, at least one of the listing price and the offer price may include a time-dependent price. The method 1000 may further include receiving 1012 a strike price. In this regard, a user, for example, associated with the established first listing object may receive a strike price based on the iterative comparison.

VI. Implementation

Embodiments disclosed herein can be implemented as one or more computer program products, i.e., one or more modules of computer program instructions encoded on a computer-readable medium for execution by, or to control the operation of, data processing apparatus. For example, the logic or software of iterative comparator engine 156, verification engine 148, escrow engine 184, database builder 180, data collection module 168, portal 188, and data export module 192 responsible for the various functionalities disclosed herein may be provided in such computer-readable medium of the network server 116 and executed by the processing engine 132 as appropriate. The computer-readable medium can be a machine-readable storage device, a machine-readable storage substrate, a non-volatile memory device, a composition of matter affecting a machine-readable propagated signal, or a combination of one or more of them. In this regard, network server 116 may encompass one or more apparatuses, devices, and machines for processing data, including, by way of example, a programmable processor, a computer or multiple processor or computers. In addition to hardware, the network server 116 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein may be written in any form of programming language, including compiled or interpreted languages, and may be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by an information flow network.

The block diagrams, processes, protocols and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In some embodiments, the network server 116 may comprise one or more of various types of devices, including, but not limited to a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for use in asynchronous tendering for variable characteristic assets within a distributed network, the method comprising:

receiving, at a processor of a network server, multiple listings from multiple listing parties for a first type of variable characteristic asset, said first type of said variable characteristic asset comprising an aircraft part, where a condition of said aircraft part is identified in relation to a set of one or more conditions including at least one of usage since the aircraft part was new and usage since the part was serviced or overhauled, each of said listings including a first listing object that includes a first listing profile for a specific first asset of said first type, said first listing profile including a condition identifier for said first asset of said first type and a listing price corresponding to said first asset of said first type;

receiving, at said processor of said network server, multiple offers from multiple offering parties for said first type of variable characteristic asset, each of said offers including a first offer object that includes a first offer profile, said first offer profile including a condition specification and an offer price corresponding to said first asset of said first type, wherein at least one of said listing price and said offer price of at least one of said listings and offers comprises a time-dependent price, said time-dependent price having a time range including a price change event at a first, predefined price change time in said time range wherein said time-dependent price changes from a first price to a second price at said first, predefined price change time, said second price having a predefined value independent of any counter-party price;

iteratively comparing, by said processor of said network server, said multiple listings and multiple said offers to determine a time-dependent price range corresponding to said first variable characteristic asset at each of a series of comparison times, said comparison times including a first comparison time before said first price change time and a second comparison time after said price change time, said time-dependent price range determined from said time-dependent price received prior to said iteratively comparing, and said time-dependent price range bounded by said listing price and by said offer price at each said comparison times, said comparing involving identifying a set of multiple comparable listings and multiple comparable offers based on a type of a subject variable characteristic asset and a condition of said variable characteristic asset, and performing a comparison with respect to each of said multiple comparable listings and multiple comparable offers;

operating said processor of said network server, at each said comparison time, to make a determination as to whether said time-dependent price range has reached a predetermined threshold for at least two comparable listing/comparable offer pairings;

selecting a specific comparable listing/comparable offer pairing of said at least two comparable listing/comparable offer pairings; and returning a strike price for said selected specific comparable listing/comparable offer pairing.

2. The method of claim 1, wherein said strike price is returned based on said offer price equaling or exceeding said listing price.

3. The method of claim 1, wherein said first listing profile is indicative of a condition-dependent status corresponding to said first variable characteristic asset, said condition-dependent status indicative of a physical condition of said first variable characteristic asset.

4. The method of claim 3, further comprising:

verifying, by said processor of said network server, said condition-dependent status of said first variable characteristic asset by identifying attributes of said first listing object that correlate to at least one of a plurality of variable characteristic asset records, each of said at least one of said plurality of variable characteristic asset records corresponding to a variable characteristic asset and including certification data for said variable characteristic asset; and determining a condition-dependent verification score at least partially based on said attributes.

5. The method of claim 4, wherein said certification data is indicative of a physical condition of said variable characteristic asset of said variable characteristic asset record, said physical condition of said variable characteristic asset of said variable characteristic asset record at least partially based on an inspection.

6. The method of claim 4, wherein said strike price is at least partially based on said condition-dependent verification score.

7. The method of claim 1, wherein said first listing object is associated with a seller profile, said seller profile including historical transactional data corresponding to at least one completed transaction, and wherein said returning comprises:

returning a generated comparison metric at least partially based on said at least one completed transaction.

8. The method of claim 7, wherein said at least one completed transaction includes a completed strike price, and wherein said comparison metric includes an average strike price corresponding to said completed strike price for said at least one completed transaction.

9. The method of claim 7, wherein said at least one completed transaction includes at least one of a historical listing price and a historical offer price, and wherein said comparison metric includes a transaction completion metric.

10. The method of claim 1, wherein said iteratively comparing is associated with an iteration rate.

11. The method of claim 10, wherein said iteration rate is at least partially based on at least one of a regular periodic interval, a variable characteristic asset-specific interval, a decreasing interval, an increasing interval, and a variable interval.

12. The method of claim 11, wherein at least one of said listing price and said offer price changes from a first value to a second value in corresponding relation to said iteration rate.

13. The method of claim 12, wherein said strike price is not determined based on information derived from said change from said first value to said second value.

14. The method of claim 1, wherein said strike price corresponds to a median value of said time-dependent price range.

15. The method of claim 1, wherein said first variable characteristic asset comprises a used component for use in an aircraft.

16. The method of claim 1, wherein said listing price comprises a time-dependent listing price, and wherein said offer price comprises a time-dependent offer price.

17. The method of claim 1, further comprising:
receiving, at said processor of said network server, a second listing object that includes a second listing profile indicative of a listing price corresponding to said first variable characteristic asset, said listing price of said second listing profile is at least one of:
  (1) greater than said listing price of said first listing profile, and
  (2) received after said listing price of said first listing profile.

18. The method of claim 1, further comprising:
receiving, at said processor of said network server, a second offer object that includes a second offer profile indicative of an offer price corresponding to said first variable characteristic asset, said offer price of said second offer profile is at least one of:
  (1) less than said offer price of said first offer profile, and
  (2) received after said offer price of said first offer profile.

19. The method of claim 1, further comprising:
providing a seller interface for enabling a seller to establish a listing schedule for changes to a said listing price, wherein said listing schedule defines a first set of designated times when said listing price changes;
providing a buyer interface for enabling a buyer to establish an offer schedule for changes to said offer price, wherein said offer schedule defines a second set of designated times when said offer price changes; and
controlling said iteratively comparing, wherein said series of comparisons is set to enable comparison of said listing price and said offer price in relation to price changes established by said listing schedule and said offer schedule.

20. A computer executed system on a computing device for asynchronous tendering for variable characteristic assets within a distributed network, comprising:
a processor of said computer executed system operative to receive multiple listings from multiple listing parties for variable characteristic assets of said first asset type, said first asset type of said variable characteristic asset comprising an aircraft part, where a condition of aircraft part is identified in relation to a set of one or more conditions including at least one of usage since the aircraft part was new and usage since the part was serviced or overhauled, each said listing including a first listing object that includes a first listing profile and multiple offers from multiple offering parties for variable characteristic assets of said first asset type, each said offer including a first offer object that includes a first offer profile, wherein said first listing profile includes a condition identifier and a listing price corresponding to a first variable characteristic asset, and wherein said first offer profile is indicative of a condition specification and an offer price corresponding to said first variable characteristic asset, at least one of said first listing object and said first offer object comprising a time-dependent price, said time-dependent price having a time range including a price change event at a first, predefined price change time in said time range wherein said time-dependent price changes from a first price to a second price at said first, predefined price change time;
an iterative comparator engine, executable by said processor of said computer executed system, configured to iteratively compare said multiple listings and said multiple offers to determine a time-dependent price range corresponding to said first variable characteristic asset at each of a series of comparison times, said comparison times including a first comparison time before said first price change time and a second comparison time after said price change time, said time-dependent price range bounded by said listing price and by said offer price each at said comparison times, said comparing involving identifying a set of multiple comparable listings and multiple comparable offers based on a type of a subject variable characteristic asset and a condition of said variable characteristic asset, and performing a comparison with respect to each of said multiple comparable listings and multiple comparable offers;
said processor of said network server further being operative, at each said comparison time, to make a determination as to whether said time-dependent price range has reached a threshold for at least two comparable listing/comparable offer pairings to select a specific comparable listing/comparable offer pairing of said at least two comparable listing/comparable offer pairings, and to return a strike price for said selected specific comparable listing/comparable offer pairing.

21. The computer executed system of claim 20, wherein said time dependent term comprises a time-dependent price of at least one of said first listing object and said first offer object, and said iterative comparator engine is operative to determine a time-dependent price range at each of said series of comparison times, said time-dependent price range bounded by said listing price and by said offer price at each said comparison times, said comparator engine operative to make a comparison at each said comparison time of said time-dependent price range to a predetermined threshold, and said strike price is returned based on said offer price equaling or exceeding said listing price.

22. The computer executed system of claim 20, wherein said first listing profile is indicative of a condition-dependent status corresponding to said first variable characteristic asset, said condition-dependent status indicative of a physical condition of said first variable characteristic asset.

23. The computer executed system of claim 22, further comprising:
a verification engine, executable by said processor of said computer executed system, configured to:
verify said condition-dependent status of said first variable characteristic asset by identifying attributes of said first listing object that correlate to at least one of a plurality of variable characteristic asset records, each of said at least one of said plurality of variable characteristic asset records corresponding to a variable characteristic asset and including certification data for said variable characteristic asset; and
determining a condition-dependent verification score at least partially based on said associations.

24. The computer executed system of claim 23, wherein said certification data is indicative of a physical condition of said variable characteristic asset of said variable characteristic asset record, said physical condition of said variable characteristic asset record at least partially based on an inspection, and wherein said condition-dependent verification score is at least partially based on a comparison of said physical condition of said first variable characteristic asset with said physical condition of said variable characteristic asset of said variable characteristic asset record.

25. The computer executed system of claim 24, wherein said strike price is at least partially based on said condition-dependent verification score.

26. The computer executed system of claim 20, wherein said first listing object is associated with a seller profile, said seller profile including transactional data corresponding to at least one completed transaction, and wherein said portal is further operable to:

transmit a generated comparison metric at least partially based on said at least one completed transaction.

27. The computer executed system of claim 26, wherein said at least one completed transaction includes a completed strike price, and wherein said comparison metric includes an average strike price corresponding to said completed strike price for said at least one completed transaction.

28. The computer executed system of claim 26, wherein said at least one completed transaction includes at least one historical listing price and at least one historical offer price, and wherein said comparison metric includes a transaction completion metric.

29. The computer executed system of claim 20, wherein said iterative comparison of said iterative comparison engine is modulated by an iteration frequency.

30. The computer executed system of claim 29, wherein said iteration frequency is at least partially based on at least one of a regular periodic interval, a variable interval, a variable characteristic asset-specific interval, a decreasing interval, an increasing interval, and a variable interval.

31. The computer executed system of claim 30, wherein at least one of said listing price and said offer price changes from a first value to a second value in corresponding relation to said iteration frequency.

32. The computer executed system of claim 31, wherein a strike price is free from information associated with said change from said first value to said second value.

33. The computer executed system of claim 20, wherein a strike price corresponds to a median value of said time-dependent price range.

34. The computer executed system of claim 20, wherein said first variable characteristic asset comprises a used component for use in an aircraft.

35. The computer executed system of claim 20, wherein said listing price comprises a time-dependent listing price, and wherein said offer price comprises a time-dependent offer price.

36. The computer executed system of claim 20, wherein said processor is operable to receive a second listing object that includes a second listing profile indicative of a listing price corresponding to said first variable characteristic asset, said listing price of said second listing profile is at least one of:

(1) greater than said listing price of said first listing profile, and (2) received after said listing price of said first listing profile.

37. The computer executed system of claim 20, wherein said processor is operable to receive a second offer object that includes a second offer profile indicative of an offer price corresponding to said first variable characteristic asset, said offer price of said second offer profile is at least one of:

(1) less than said offer price of said first offer profile, and (2) received after said offer price of said first offer profile.

38. The computer executed system of claim 20, further comprising:

a seller portal, executable by said processor of said computer executed system, configured to receive from a seller, a listing schedule defining time-dependent changes to said listing price, wherein said listing schedule designates a set of times for changing said listing price;

a buyer portal, executable by said processor of said computer executed system, configured to receive from a buyer, an offer schedule defining time-dependent changes to said offer price, wherein said offer schedule designates a set of times for changing said offer price; and wherein said iterative comparator engine is configured to set said series of comparison times of said listing price and said offer price in relation to price changes defined by said listing schedule and said offer schedule.

* * * * *